(12) United States Patent
Hiramatsu et al.

(10) Patent No.: US 8,794,370 B2
(45) Date of Patent: Aug. 5, 2014

(54) POWERTRAIN SYSTEM FOR MOTOR VEHICLE AND MOTOR VEHICLE LOWER STRUCTURE HAVING THE SAME

(75) Inventors: Masaya Hiramatsu, Dusseldorf (DE); Fumitaka Andou, Hatsukaichi (JP); Toshihide Koyama, Hiroshima (JP); Hiroaki Takeshita, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/635,294

(22) PCT Filed: Mar. 30, 2011

(86) PCT No.: PCT/JP2011/001890
§ 371 (c)(1),
(2), (4) Date: Sep. 14, 2012

(87) PCT Pub. No.: WO2011/122013
PCT Pub. Date: Oct. 6, 2011

(65) Prior Publication Data
US 2013/0008735 A1      Jan. 10, 2013

(30) Foreign Application Priority Data
Mar. 30, 2010   (JP) .................................. 2010-077038

(51) Int. Cl.
*B60K 17/00*   (2006.01)
(52) U.S. Cl.
USPC ........... 180/378; 180/274; 180/377; 180/379; 180/384; 403/2
(58) Field of Classification Search
USPC ......... 180/291, 378, 379, 384, 232, 377, 382, 180/298, 360; 464/124, 146, 162; 403/2
See application file for complete search history.

(56) References Cited

U.S. PATENT DOCUMENTS

| | | | | | |
|---|---|---|---|---|---|
| 4,699,230 A | * | 10/1987 | Solleder et al. | ............... | 180/360 |
| 4,852,897 A | * | 8/1989 | Takatani et al. | ............... | 180/414 |

(Continued)

FOREIGN PATENT DOCUMENTS

| EP | 0965476 A2 | 12/1999 |
|---|---|---|
| EP | 1980437 A1 | 4/2008 |

(Continued)

OTHER PUBLICATIONS

Raw machine translation from Japanese Patent Office for JP 08-58406.*

(Continued)

*Primary Examiner* — J. Allen Shriver, II
*Assistant Examiner* — Steve Clemmons
(74) *Attorney, Agent, or Firm* — Studebaker & Brackett PC

(57) ABSTRACT

A powertrain system for a motor vehicle comprises a power unit (2), a differential module (3) and a propeller shaft (4) provided to extend in a frontward-rearward direction of a vehicle body to transmit drive power of the power unit (2) to the differential module (3). The propeller shaft (4) is divided into a front shaft segment (4a) a rear shaft segment (4b) through the intermediary of a third universal joint (43), and adapted to be contracted in such a manner that the front shaft segment (4a) is fitted into an end of the rear shaft segment (4b) over a contractable range D1, together with a part of the third universal joint (43). The differential module (3) has a module body (31), and a rear support section (33) which supports the module body (31) to allow a front portion of the module body (31) to be swingably moved downwardly.

9 Claims, 12 Drawing Sheets

(56) References Cited

U.S. PATENT DOCUMENTS

| | | | |
|---|---|---|---|
| 5,036,943 A * | 8/1991 | Kashiwagi | 180/380 |
| 5,161,638 A * | 11/1992 | Hirano | 180/360 |
| 5,582,546 A * | 12/1996 | Welschof | 464/141 |
| 6,213,245 B1 * | 4/2001 | Murata et al. | 180/377 |
| 6,379,255 B1 * | 4/2002 | Cermak et al. | 464/179 |
| 6,394,215 B1 * | 5/2002 | Masuda | 180/232 |
| 6,435,299 B1 * | 8/2002 | Miller | 180/381 |
| 6,623,020 B1 * | 9/2003 | Satou | 280/124.109 |
| 6,766,877 B2 * | 7/2004 | Blumke et al. | 180/379 |
| 6,913,105 B2 * | 7/2005 | Masuda et al. | 180/381 |
| 2001/0052432 A1 * | 12/2001 | Yoshioka | 180/68.3 |
| 2002/0117344 A1 | 8/2002 | Miller | |
| 2003/0008716 A1 * | 1/2003 | Boutin | 464/15 |
| 2003/0096653 A1 * | 5/2003 | Sugiyama et al. | 464/146 |
| 2006/0040753 A1 * | 2/2006 | Kai et al. | 464/179 |
| 2008/0182673 A1 * | 7/2008 | Habara | 464/181 |
| 2008/0251306 A1 * | 10/2008 | Kobayashi et al. | 180/89.2 |
| 2010/0032542 A1 * | 2/2010 | Heitkamp et al. | 248/548 |

FOREIGN PATENT DOCUMENTS

| | | | | |
|---|---|---|---|---|
| EP | 1980437 A1 | 10/2008 | | |
| JP | 62085719 A * | 4/1987 | | B60K 17/16 |
| JP | 05-215120 A | 8/1993 | | |
| JP | 07-040752 A | 2/1995 | | |
| JP | 08058406 A * | 3/1996 | | B60K 17/24 |
| JP | H10-338046 A | 12/1998 | | |
| JP | 2000-085390 A | 3/2000 | | |
| JP | 2001-171373 A | 6/2001 | | |
| JP | 2004-322816 A | 11/2004 | | |
| JP | 2005-297626 A | 10/2005 | | |
| JP | 2005297626 A * | 10/2005 | | B62D 25/20 |
| JP | 2006-290174 A | 10/2006 | | |
| JP | 2008265691 A | 11/2008 | | |

OTHER PUBLICATIONS

Raw machine translation from Japanese Patent Office for JP 2005-297626.*

Raw machine translation from Japanese Patent Office for JP 2001-171373.*

International Search Report; PCT/JP2011/001890; May 31, 2011.

An Office Action: "Notice of Reasons for Rejection," issued by the Japanese Patent Office on Aug. 27, 2013, which corresponds to Japanese Patent Application No. 2010-077040 and is related to U.S. Appl. No. 13/635,294; with translation.

An Office Action: "Notice of Reasons for Rejection," issued by the Japanese Patent Office on Sep. 10, 2013, which corresponds to Japanese Patent Application No. 2010-077038 and is related to U.S. Appl. No. 13/635,294; with translation.

* cited by examiner

POWERTRAIN SYSTEM FOR MOTOR VEHICLE AND MOTOR VEHICLE LOWER STRUCTURE HAVING THE SAME

TECHNICAL FIELD

The present invention relates to a motor vehicle powertrain system designed to transmit drive power from a power unit including an engine body and provided in a front region of a vehicle body, to a rear differential module via a power transmitting shaft such as a propeller shaft, and a motor vehicle lower structure having the powertrain system.

BACKGROUND ART

Heretofore, there has been widely known a motor vehicle in which an engine constituting a power unit is disposed in a front region of a vehicle body, and drive power of the engine is transmitted to a rear differential module and others disposed in a rear region of the vehicle body via a propeller shaft disposed along a frontward-rearward direction of the vehicle body, such as a four-wheel-drive type or so-called FR (front-engine, rear-wheel drive) type motor vehicle.

Generally, a motor vehicle is designed such that, in the event of a collision where an impact force is transmitted in a frontward-rearward direction of a vehicle body, for example, a frontal collision, the impact force is absorbed by allowing a front region of the vehicle body to be crushed or collapsed, while allowing an engine disposed in the front region of the vehicle body to be displaced rearwardly. Although the above motor vehicle having a power transmitting shaft such as a propeller shaft is also designed to allow the front region of the vehicle body to be collapsed while allowing the engine to be displaced rearwardly, the rearward displacement of the engine is apt to be hindered, because the engine is supported from a rear side thereof by the propeller shaft (in a braced state). Thus, in this type of powertrain system, various efforts have been made to relax the braced state which would otherwise be caused by the propeller shaft during a collision.

For example, the following Patent Document 1 discloses a powertrain system which comprises a propeller shaft having a first shaft and a second shaft coupled together through an intermediate joint, wherein the propeller shaft is adapted, when an external force is applied in an axial direction thereof, for example, during a collision in a frontward-rearward direction of a vehicle body, to be axially contracted in such a manner that a distal end of the second shaft is fitted into a base end of the first shaft. In the powertrain system disclosed in the Patent Document 1, based on the axial contraction of the propeller shaft, an engine can be displaced rearwardly by just that much, so that it becomes possible to relax the braced state.

The following Patent Document 2 discloses a powertrain system which comprises an engine provided in a front region of a vehicle body, a differential module provided in a rear region of the vehicle body, and a propeller shaft for transmitting drive power of the engine to the differential module. The differential module has a front support section and a rear support section which support a front portion and a rear portion thereof to the vehicle body, respectively. The front support section is adapted to be broken during a frontal collision, and the rear support section is adapted to support the differential module in a swingable manner during the collision. In this powertrain system, an impact load input into the propeller shaft during a frontal collision causes breaking of the front support section of the differential module to which the propeller shaft is couple, and, upon the breaking, the front portion of the differential module is swingably moved downwardly, so that it becomes possible to relax the braced state which would otherwise be caused by the propeller shaft.

CITATION LIST

Patent Literature

PTL 1: JP 5-215120A
PTL 2: JP 2001-171373A

SUMMARY OF INVENTION

Technical Problem

Although the powertrain system disclosed in the Patent Document 1 is designed to permit a rearward displacement of the engine according to the contraction of the propeller shaft, a contractable range of the propeller shaft is limited to a certain amount. Thus, as a prerequisite to ensuring a sufficient rearward displacement of the engine, it is necessary to divide the propeller shaft into a larger number of shaft segments and form a contractable structure in each of the divided areas, which inevitably causes an increase in production cost.

The powertrain system disclosed in the Patent Document 2 is designed to permit a rearward displacement of the engine during a frontal collision, in such a manner that a rear end of the propeller shaft is displaced rearwardly, based on front-tilting of the differential module caused by a downward swinging movement of the front portion of the differential module. However, this displacement is also limited to a certain amount.

As above, each of the powertrain systems disclosed in the Patent Documents 1 and 2 is unsatisfactory in terms of a rearward displacement amount of an engine during a collision in a frontward-rearward direction of a vehicle body, and involves a problem that the rearward displacement amount cannot be sufficiently ensured without an increase in production cost.

In view of the above conventional problem, it is an object of the present invention to provide a powertrain system for a motor vehicle, capable of sufficiently ensuring a rearward displacement amount of a power unit including an engine, during a collision in a frontward-rearward direction of a vehicle body, to sufficiently obtain a collision-impact cushioning effect, while suppressing an increase in production cost, and a motor vehicle lower structure having the powertrain system.

Solution to Problem

In order to solve the above problem, the present invention provides a powertrain system for a motor vehicle, which comprises a power unit provided in a front region of a vehicle body, a differential module provided in a rear region of the vehicle body, and a power transmitting shaft provided to extend in a frontward-rearward direction of the vehicle body to transmit drive power of the power unit to the differential module. The powertrain system is characterized in that: the power transmitting shaft is divided into a front shaft segment and a rear shaft segment through the intermediary of a universal joint, and adapted, during a relative displacement between the power unit and the differential module in an approaching direction, along with deformation of the vehicle body, to be contracted in such a manner that one of the front and rear shaft segments is fitted into an end of the other shaft segment over a given range, together with at least a part of the universal joint; and the differential module has a module body, and a rear support section which supports a rear portion of the module body at a position above a coupling section for coupling between the module body and the power transmitting shaft, so as to allow the module body to be supported in such a manner that a front portion of the module body is swingably moved downwardly during the relative displacement in the approaching direction.

In the powertrain system of the present invention, the power transmitting shaft is divided into the front and rear shaft segments through the intermediary of the universal joint, and adapted, during a relative displacement between the power unit and the differential module in an approaching direction, for example, during a collision of the motor vehicle, to be contracted in such a manner that one of the front and rear shaft segments is fitted into an end of the other shaft segment over a given range, so that it becomes possible to allow the power unit to be displaced rearwardly during a frontal collision, according to the contraction of the power transmitting shaft. In addition, the differential module has the module body, and the rear support section which supports the rear portion of the module body at a position above the coupling section for coupling between the module body and the power transmitting shaft, so that it becomes possible to allow the front portion of the module body to be swingably moved downwardly, according to a bending moment occurring in the module body when a load is input from the power transmitting shaft into the module body. Along with the swinging movement, the coupling section for coupling between the power transmitting shaft and the module body is displaced rearwardly. This makes it possible to increase a rearward displacement amount of the power unit by a simple mechanism. Further, the rear support section supports the rear portion of the module body during the swinging movement. This makes it possible to effectively prevent the rear portion of the module body from being lifted upwardly due to the front-tilting of the differential module caused by the downward swinging movement of the front portion of the module body, and effectively suppress interference between the module body and other component therearound.

As above, in the powertrain system of the present invention, the rearward displacement amount of the power unit can be increased in a simple manner. In addition, the increase in the rearward displacement amount is achieved by a simple mechanism based on an improvement in support structure for the rear support section of the differential module, instead of relying on only the mechanism for contracting the power transmitting shaft, so that it become possible to maximally suppress an increase in production cost.

In the powertrain system of the present invention, the power transmitting shaft may be designed such that only longitudinally opposite ends thereof are supported, or may be designed such that a longitudinally intermediate portion thereof is also rotatably supported to the vehicle body. For example, the powertrain system of the present invention may further comprise an intermediate support section which rotatably supports an end of the front shaft segment on the side of the universal joint, to the vehicle body. In this case, it is preferable that the intermediate support section is adapted, when an axial external force having a given value or more is input from the front shaft segment thereinto, to be released from an engaged state with the vehicle body. In this case, the number of the intermediate support sections is not particularly limited. For example, the intermediate support section may also be provided on the rear shaft segment, in addition to the front shaft segment.

According to this feature, the power transmitting shaft is supported by the intermediate support section, at an intermediate position thereof, so that it becomes possible to stably rotate the power transmitting shaft. Further, the engaged state between the intermediate support section and the vehicle body (a member constituting the vehicle body, such as a cross member) is released in response to an input of an axial external force having a given value or more, so that it becomes possible to allow the power unit to be smoothly displaced rearwardly during a collision in the frontward-rearward direction of the vehicle body, without hindering the contraction of the power transmitting shaft and the front-tilting of the differential module.

In the powertrain system of the present invention, while a structure for supporting the differential module to the vehicle body is not particularly limited, it is preferable that, in addition to the rear support section, the differential module further has a front support section which supports the module body to a rear member of the vehicle body, on a frontward side of the vehicle body with respect to the rear support section. In this case, the front support section preferably includes a support bracket extending from the module body toward the rear member of the vehicle body, wherein one end of the support bracket is adapted, when the differential module is relatively displaced with respect to the power unit in an approaching direction, to be brought into contact with the rear member of the vehicle body from the side of the front region of the vehicle body, and, during a relative movement between the power unit and the module body in an approaching direction, to be broken.

According to this feature, one end of the support bracket is brought into contact with the rear member of the motor vehicle from the side of the front region of the vehicle body, so that, during a frontal collision, a large impact load is more likely to be instantaneously applied to the support bracket, as compared with a structure in which the support bracket faces the rear member of the vehicle body in the frontward-rearward direction of the vehicle body through a cushioning member such as a rubber mount. Thus, during a collision such as a frontal collision, the support bracket can be easily broken in cooperation with the function of allowing it to be broken during the relative movement between the power unit and the module body in the approaching direction, so that it becomes possible to shift the module body to a front-tilting posture in a relatively easy manner, irrespective of a height at which the front support section supports the differential module.

In cases where the powertrain system comprises the intermediate support section, the intermediate support section is adapted to be released from the engaged state with the vehicle body under a given condition, as mentioned above. In the powertrain system of the present invention, while a specific structure for releasing the engaged state is not particularly limited, it is preferable that the front shaft segment has disengaging means adapted to interfere with the intermediate support section within a contractable range of the power transmitting shaft to release the engaged state between the intermediate support section and the vehicle body.

According to this feature, the engaged state between the intermediate support section and the vehicle body can be relatively easily released by the disengaging means, so that it becomes possible to allow the power unit to be more smoothly displaced rearwardly during a collision in the frontward-rearward direction of the vehicle body, such as a frontal collision.

Preferably, in the powertrain system of the present invention, the power transmitting shaft is provided with fit-in restraining means adapted to restrain the one of the front and rear shaft segments from being fitted into the end of the other shaft segment, so as to limit a contractable range thereof.

According to this feature, the contractable range of the power transmitting shaft can be limited in a simple manner. Further, based on using the fit-in restraining means in combination with the front support section of the differential module, an impact load for causing breaking of the front support section can be effectively transmitted through the power transmitting shaft to break the front support section at an adequate timing.

The present invention also provides a motor vehicle lower structure which comprises: the powertrain system as described in any one of the aforementioned paragraphs; a floor tunnel portion which extends along the frontward-rearward direction of the vehicle body and receives therein the power transmitting shaft of the powertrain system along the frontward-rearward direction of the vehicle body; and a tunnel cross member provided in the vehicle body in such a manner as to extend across the floor tunnel portion in a widthwise direction of the vehicle body, at a position beneath the power transmitting shaft, wherein the tunnel cross member is joined to the vehicle body in such a manner that it is disengageable from the vehicle body under a downward load.

The motor vehicle lower structure of the present invention is provided with the tunnel cross member, so that it becomes possible to enhance the rigidity of the vehicle body in the widthwise direction. In addition, the tunnel cross member is joined to the vehicle body in such a manner that it is disengageable from the vehicle body under a downward load. Thus, when a path of the power transmitting shaft is moved downwardly due to the front-tilting of the differential module, the power transmitting shaft is brought into interference with the tunnel cross member to release an engaged state of the tunnel cross member as a reinforcing member, with the vehicle body, so that it becomes possible to reliably ensure the rearward displacement of the power unit during a frontal collision.

Preferably, in the powertrain system of the present invention, the vehicle body has a rearward displacement-permitting space defined between the power unit and a dash panel disposed horizontally rearward of the power unit, wherein the power unit is adapted, during the relative displacement in the approaching direction, to be displaceable horizontally rearwardly over a given rearward displacement-allowed range thereof.

Thus, during the displacement, the power unit is firstly moved into the rearward displacement-permitting space and thus displaced rearwardly so as to allow the power transmitting shaft to be contracted reliably and smoothly before the power transmitting shaft is bent around the universal joint due to the swinging movement of the module body caused by a subsequent rearward displacement of the power unit.

More preferably, in the above powertrain system, the power transmitting shaft is provided with fit-in restraining means adapted to restrain the one of the front and rear shaft segments from being fitted into the end of the other shaft segment, so as to limit a contractable range thereof, wherein the contractable range of the power transmitting shaft is set to be shorter than the rearward displacement-allowed range of the power unit.

According to this feature, after completion of the contraction of the power transmitting shaft, the power unit can further be displaced horizontally rearwardly to allow the module body of the differential module to be swingably moved downward to the front-tilting posture, according to the remaining horizontal rearward displacement of the power unit. In other words, this feature makes it possible to smoothly cause the contraction of the power transmitting shaft and the downward swinging movement of the differential module in a stepwise manner so as to increase the rearward displacement amount of the power unit reliably and smoothly.

According to another aspect of the present invention, there is provided a motor vehicle lower structure which is characterized in that it comprises: the above powertrain system, wherein the powertrain system includes an engine body as a part of the power unit; a dash panel disposed rearward of the power unit of the powertrain system; and an exhaust device connected to the power unit and disposed in the rearward displacement-permitting space, wherein the dash panel has a dash tunnel portion concaved in a rearward direction of the vehicle body, and the exhaust device is disposed to face the dash tunnel portion in front-rear relation.

In this motor vehicle lower structure of the present invention, the exhaust device is disposed in the rearward displacement-permitting space, so that it becomes possible to diversify a layout in the front region of the vehicle body. In addition, during the relative displacement between the power unit and the differential module in the approaching direction, along with deformation of the vehicle body due to a collision, etc., the exhaust device is moved into the dash tunnel portion while being pushed by the power unit, so that it becomes possible to ensure the rearward displacement-permitting space. In other words, the above motor vehicle lower structure of the present invention makes it possible to sufficiently ensure the rearward displacement amount of the power unit while effectively utilizing the rearward displacement-permitting space.

According to yet another aspect of the present invention, there is provided a motor vehicle lower structure which is characterized in that it comprises the above powertrain system, wherein the powertrain system includes an engine body as a part of the power unit; an intake manifold for introducing fresh air into the engine body, wherein the engine body is a transverse type which is mounted to allow a crankshaft thereof to extend in a direction transverse to a travelling direction of the motor vehicle; and the intake manifold is disposed in front of an upper portion of the engine body.

In this motor vehicle lower structure of the present invention, the intake manifold is disposed in front of the upper portion of the engine body, so that it becomes possible to receive an impact force due to a collision, by a surface formed by the engine body and the intake manifold, so as to allow the power unit to be displaced horizontally rearwardly in a reliable and smooth manner.

Advantageous Effects of Invention

In the powertrain system of the present invention, the rearward displacement amount of the power unit can be increased in a simple manner. In addition, the increase in the rearward displacement amount is achieved by a simple mechanism based on an improvement of a support structure for the rear portion of the differential module, so that it become possible to maximally suppress an increase in production cost.

DESCRIPTION OF EMBODIMENTS

Figure 1:
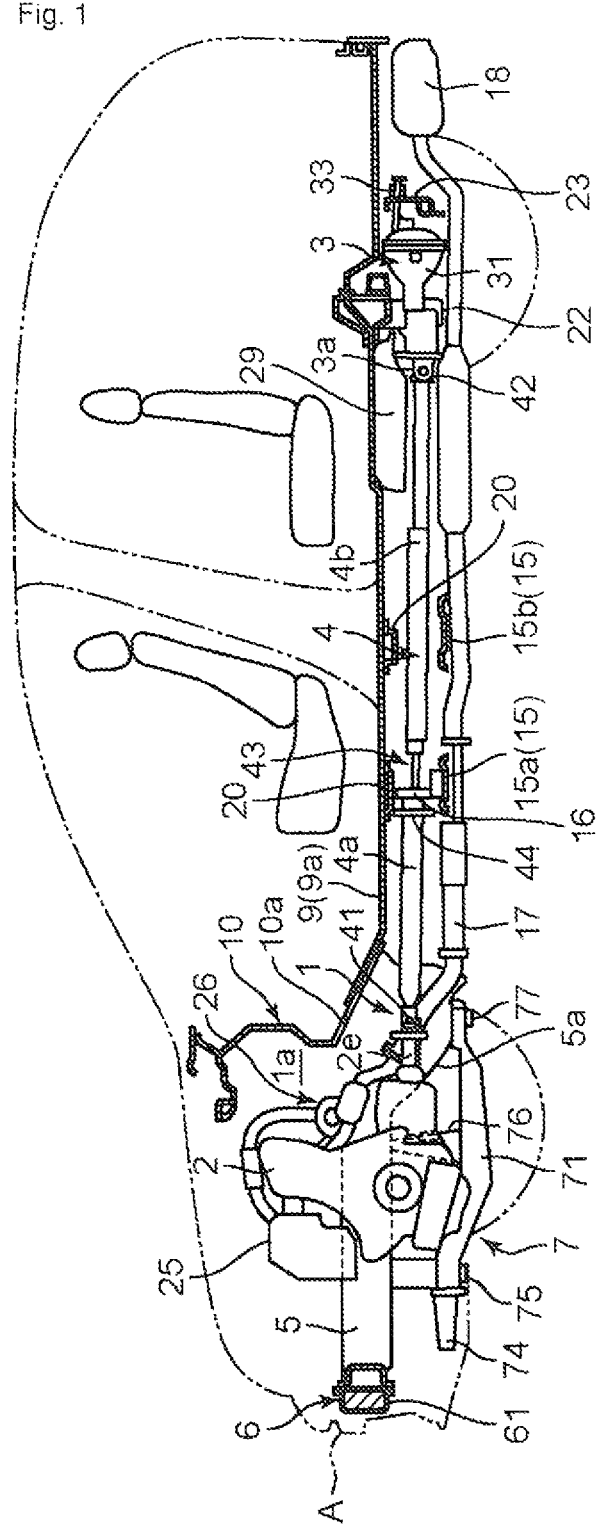
FIG. 1 is a side view schematically showing a motor vehicle with a powertrain system according to one embodiment of the present invention.

With reference to the drawings, the present invention will now be described based on one embodiment thereof. FIG. 1 is a side view schematically showing a motor vehicle with a powertrain system according to one embodiment of the present invention. Although this embodiment will be described based on an example where the motor vehicle with the powertrain system is an FR hatchback type, the motor vehicle is not limited to a specific type, but may be any type designed to transmit drive power from a power unit disposed in a front region of a vehicle body, to a rear region of the vehicle body through a power transmitting shaft, such as an FR sedan type, an FR sports type or an FR minivan type.

The powertrain system 1 according to this embodiment comprises a power unit 2 disposed in a front region of a vehicle body, a rear differential module 3 disposed in a rear region of the vehicle body, and a propeller shaft (equivalent to a power transmitting shaft) 4 disposed to extend in a frontward-rearward direction of the vehicle body to couple the power unit 2 and the rear differential module 3 together.

Figure 2:
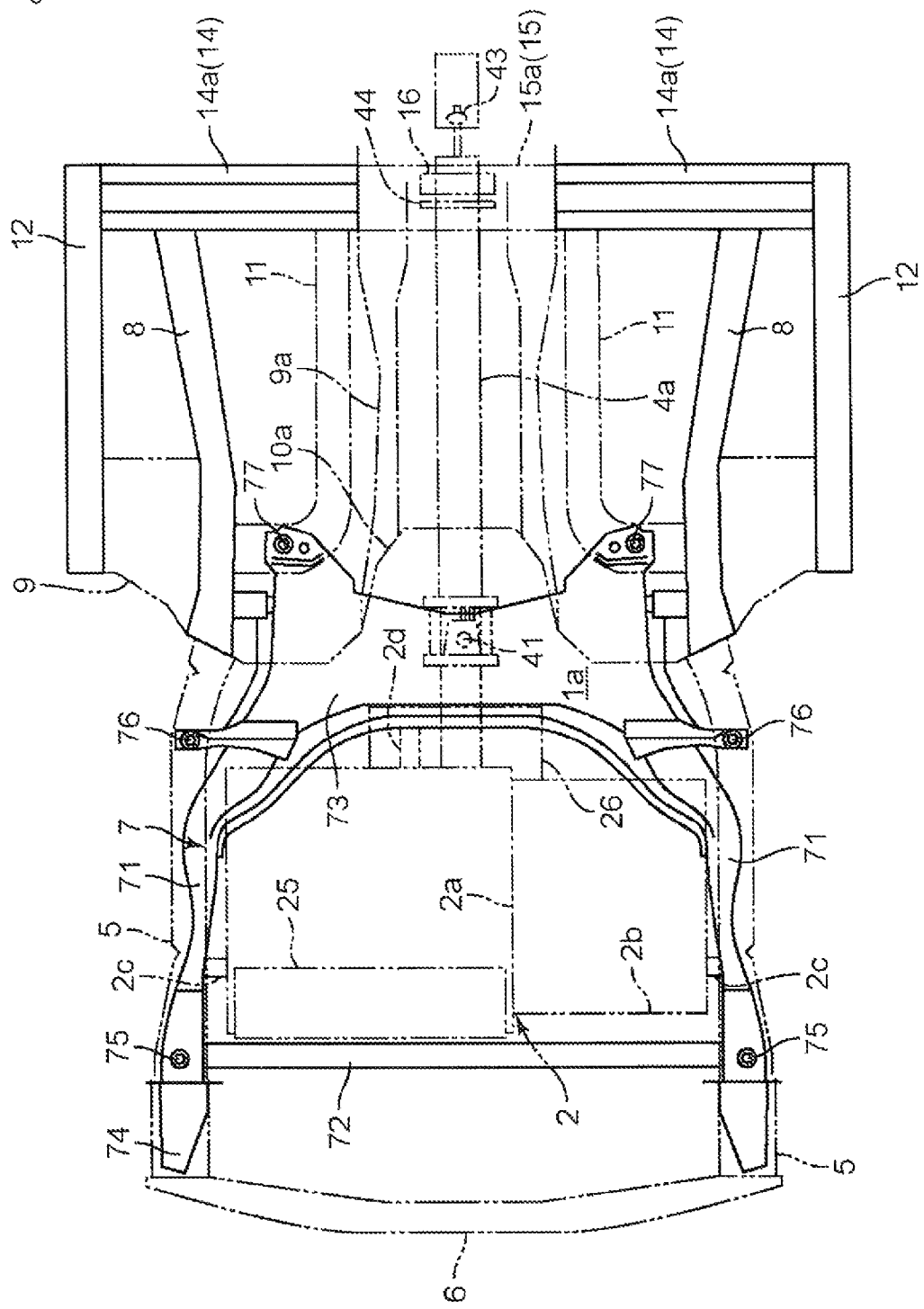
FIG. 2 is a top plan view showing a structure of a front region of a vehicle body of the motor vehicle in FIG. 1.

As shown in FIG. 2, the power unit 2 comprises an engine body 2a adapted to generate drive power, and a transmission 2b interposed between the engine body 2a and the propeller shaft 4. The power unit 2 is mounted to the front region of the vehicle body through mounting means such as an engine mount.

Figure 3:
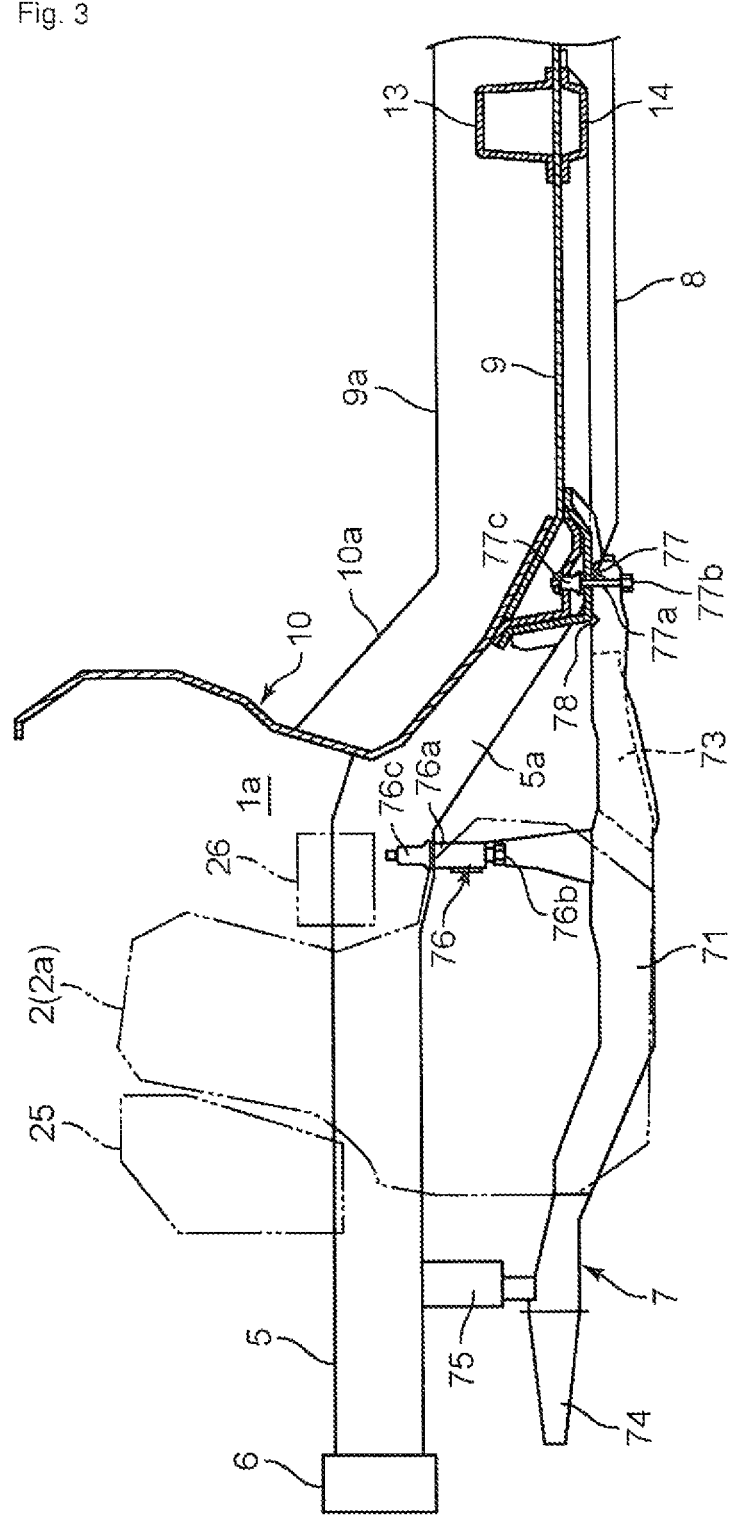
FIG. 3 is a side sectional view showing the structure of the front region of the vehicle body in FIG. 2.

FIG. 2 is a top plan view showing a structure of the front region of the vehicle body, and FIG. 3 is a side view showing the structure of the front region of the vehicle body. With reference to FIGS. 2 and 3 in addition to FIG. 1, the front region of the vehicle body will be firstly described.

The front region of vehicle body is provided with a pair of right and left front side frames 5, and a bumper reinforcement 6 bridged between respective front edges of the front side frames 5, and a generally rectangular-shaped front subframe 7 is disposed below the front side frames 5.

As clearly shown in FIG. 3, each of the front side frames 5 has a rear portion which is inclined obliquely downwardly in the rearward direction to form a kick-up portion 5a, and a rear end of the kick-up portion 5a is connected to a floor frame 8 (which is omitted in FIG. 1). A floor panel 9 is joined onto the floor frame 8, and a front edge of the floor panel 9 is connected to a dash panel 10 which partitions between an engine compartment and a passenger compartment. The floor panel 9 has a floor tunnel portion 9a provided in a widthwise central region (central region in a widthwise direction of the vehicle body) thereof to extend in the frontward-rearward direction of the vehicle body while protruding upwardly. The propeller shaft 4 is received in the floor tunnel portion 9a along the frontward-rearward direction of the vehicle body. The floor tunnel portion 9a is connected to a dash tunnel portion 10a provided in a widthwise central region of the dash panel 10. The dash tunnel portion 10a is formed by rearwardly concaving the widthwise central region of the dash panel 10. A pair of tunnel frames 11 are provided on a widthwise inner side of respective ones of the floor frames 8 and on respective ones of both sides of the floor tunnel portion 9a, to extend along the frontward-rearward direction of the vehicle body so as to reinforce the floor tunnel portion 9a. Further, a pair of side sills 12 are provided on a widthwise outer side of respective ones of the floor frames 8.

A floor cross member 13 is provided on an upper surface of the floor panel 9 to extend between the floor tunnel portion 9a and each of the side sills 12 in the widthwise direction of the vehicle body. A pair of right and left intermediate cross members 14 are provided on an opposite side of the floor cross member 13 across the floor panel 9, to extend to the floor tunnel portion 9a in the widthwise direction of the vehicle body. A plurality of the pairs (in this embodiment, two pairs) of right and left intermediate cross members 14 are provided side-by-side along the frontward-rearward direction of the vehicle body. In an area between each of the two pairs of right and left intermediate cross members 14, a tunnel cross member 15 is provided in such a manner as to extend across the floor tunnel portion 9a in the widthwise direction of the vehicle body, at a position beneath the propeller shaft 4, and a tunnel reinforcing member 20 is provided along an inner wall surface of the floor tunnel portion 9a (see FIG. 1). The rigidity of the floor tunnel portion 9a, and the rigidity of the vehicle body in the widthwise direction thereof, are enhanced by the tunnel cross members 15 and the tunnel reinforcing members 20.

Each of the tunnel cross members 15 is formed as a rigid member which has one or more curved portions in sectional view. An intermediate bearing 16 for rotatably supporting the propeller shaft 4 is attached to one (after-mentioned tunnel cross member 15a) of the two tunnel cross members 15, which is disposed on the frontward side of the vehicle body with respect to the other tunnel cross members. A structure for attaching the tunnel cross member 15 to the intermediate cross members 14 will be described later in connection with the description of the intermediate bearing 16.

The bumper reinforcement 6 is bridged between respective front edge surfaces of the front side frames 5 through a pair of right and left crush cans 61 (each serving as a cushioning member) each formed in a generally angular C shape in side sectional view of the motor vehicle and provided thereinside.

The front subframe 7 is a deformable perimeter-type subframe, so-called perimeter frame, which is adapted to suppress transmission of vibration of the engine body 2a provided in the engine compartment, and disperse and absorb an impact load during a frontal collision. With reference to FIGS. 2 and 3, the front subframe 7 will be briefly described.

The front subframe 7 comprises: a pair of right and left sub-side frames 71 each provided to extend in the frontward-rearward direction of the vehicle body; a front sub-cross member 72 bridged between respective front ends of the sub-side frames 71; a rear sub-cross member 73 bridged between respective rear ends of the sub-side frames 71; and a pair of right and left crush cans 74 each provided on a front edge of a respective one of the sub-side frames 71 to protrude frontwardly. The front subframe 7 is formed in a generally rectangular shape as a whole, more specifically, a generally trapezoidal shape having a width which increases toward the frontward side of the vehicle body.

Further, the front subframe 7 has a plurality of frame support units 75 to 77 provided on each of the sub-side frames 71 side-by-side along a longitudinal direction of the sub-side frame 71. The front subframe 7 is attached to given positions of respective lower surfaces of the front side frames 5 and the tunnel frames 11 each disposed thereabove, through the frame support units 75 to 77. At least a part of the frame support units 75 to 77, for example, each of the right and left intermediate frame support units 76 and each of the right and left rear frame support units 77, are adapted, when an impact load is input into the front subframe 7 during a collision of the motor vehicle, to be disengageable from the front region of the vehicle body such as a corresponding one of the front side frames 5 or the tunnel frames 11. Specifically, in this embodiment, the front subframe 7 is set up such that, in response to an input of an impact load thereinto, the intermediate frame support unit 76 and the rear frame support unit 77 are disengaged in this order.

More specifically, the intermediate frame support unit 76 includes a tube-shaped attaching portion 76a extending in an upward-downward direction, and a bolt 76b which is inserted into the tube-shaped attaching portion 76a from therebelow to penetrate through a lower wall of the front side frame 5, and screwed with a tube-shaped weld nut 76c. As above, the intermediate frame support unit 76 is formed to include the tube-shaped attaching portion, so that three-dimensional torsion will occur in the tube-shaped attaching portion, which allows the intermediate frame support unit 76 to be easily broken, as compared with the remaining frame support units 75, 77.

On the other hand, each of the right and left rear frame support unit 77 is adapted to support the front subframe 7 to a front member (including the tunnel frames 11) of the vehicle body in such a manner as to allow the front subframe 7 to be displaced in the rearward direction of the vehicle body within a given range. This prevents the rear frame support unit 77 from being disengaged from the front member of the vehicle body before the intermediate frame support unit 76. Specifically, the rear frame support unit 77 includes a so-called rubber bush 77a, and a bolt 77b which is inserted into the rubber bush 77a to penetrate through a lower wall of the tunnel frame 11, and screwed with a tube-shaped weld nut 77c. The rubber bush 77a is formed to be swingable without a slide movement under a non-lubricated condition, based on a structure where an axially-compressed rubber is interposed between inner and outer cylinders.

As for the rear frame support unit 77, in place of the rubber bush, any other suitable structure capable of supporting the front subframe 7 in a displaceable manner may be employed. For example, the front subframe 7 may be attached through a tube-shaped member into which the bolt 77b is loosely inserted. Each of the right and left sub-side frames 71 has a downwardly concaved bead 78 formed in an upper surface thereof at a position frontward of the rear frame support unit 77 to extend along the widthwise direction of the vehicle body. The bead 78 allows the sub-side frame 71 to be easily bent downwardly.

The power unit 2 is assembled such that right and left ends of a frontward upper portion thereof are mounted to respective one of the right and left front side frames 5 within the engine compartment defined frontward of the dash panel 10, through a pair of right and left front engine mounts 2c, and an approximately central region of a rearward lower portion thereof is mounted to the front subframe 7 (specifically, the rear sub-cross member 73) through a rear engine mount 2d. Thus, when the intermediate frame support units 76 and the rear frame support units 77 of the front subframe 7 are disengaged from the front region of the vehicle body such as the front side frames 5 due to a frontal collision, a rear portion of the power unit 2 is swingably moved downwardly, and thereby a level of rearward inclination of the power unit 2 becomes larger. In this state, if an impact load is further input into the front subframe 7, each of the front engine mounts 2c is deformed or broken, and thereby the power unit 2 is dropped, i.e., displaced, downwardly. In the above assembled state of the power unit 2, the rear sub-cross member 73 of the front subframe 7 is located rearward of the lower portion of the power unit 2.

The engine body 2a constituting the power unit 2 is an internal combustion engine and formed as an inline multi-cylinder gasoline engine. The engine body 2a is a so-called transverse type which is mounted to the front region of the vehicle body in such a manner that a crankshaft as an output shaft thereof is oriented in the widthwise direction of the vehicle body. As clearly shown in FIGS. 1 and 3, the engine body 2a is disposed in a rearwardly inclined posture where an upper portion thereof is inclined rearwardly.

The engine body 2a employs a front intake/rear exhaust system designed to introduce fresh air from the side of a front surface thereof, and discharge exhaust gas from the side of a rear surface thereof. Thus, an intake manifold 25 is disposed in front of the upper portion of the engine body 2a to introduce fresh air into the engine body 2a, and an exhaust device 26, such as an exhaust manifold, an exhaust turbine and a high-temperature catalyst, is disposed behind the power unit 2.

Specifically, the intake manifold 25 is disposed above a lower portion of and in front of the upper portion of the engine body 2a disposed in the rearwardly inclined posture. Thus, an approximately planar surface is formed by the intake manifold 25 and the engine body 2a, and an impact load from a front end of the vehicle body can be received by the approximately planar surface, so that it becomes possible to allow the engine body 2a to be displaced horizontally rearwardly while maintaining the rearwardly inclined posture, during a frontal collision, based on cooperation between the intake manifold 25 and the engine body 2a.

The exhaust device 26 is formed to include an exhaust manifold, an exhaust turbine and a high-temperature catalyst, and disposed in a rearward displacement-permitting space 1a at a position rearward of an approximately widthwise central portion of the power unit 2. In other words, a rearward displacement-permitting space 1a is defined horizontally rearward of the power unit 2 and between the power unit 2 and the dash panel 10, and the exhaust device 26 is disposed in the rearward displacement-permitting space 1a. The elements of the exhaust device 26 are scatteredly disposed while providing a gap therebetween, in view of a need for ensuring ventilation therearound for cooling. Thus, the elements of the exhaust device 26 are gradually compacted along with the rearward displacement of the power unit 2, so that it becomes possible to create a space for ensuring the rearward displacement of the power unit 2. Specifically, the rearward displacement-permitting space 1a means a space for ensuring a horizontally rearward displacement of the power unit, for example, during a frontal collision of the motor vehicle, and includes a space which is defined between the power unit 2 and the dash panel 10, wherein no member is provided therein, or a member is provided therein in such a manner as to allow the rearward displacement of the power unit 2, for example, in such a manner that it is collapsed (and compacted) or rearwardly displaced along with the rearward displacement of the power unit 2, i.e., it does not matter whether or not a member is disposed in the space.

More specifically, the exhaust device 26 is disposed in front of the dash tunnel portion 10*a* in the rearward displacement-permitting space 1*a*. In other words, the exhaust device 26 is disposed to face the dash tunnel portion 10*a* in the frontward-rearward direction of the vehicle body. Therefore, according to the rearward displacement of the power unit 2 during a frontal collision, the exhaust device 26 is pushed into the dash tunnel portion 10*a* while being collapsed and compacted, so that it becomes possible to ensure the rearward displacement-permitting space 1*a* for the power unit 2. In order to smoothen a flow of exhaust gas, the exhaust device 26 is provided to extend from the engine body 2*a* in the rearward direction of the vehicle body and obliquely downwardly, and an exhaust pipe 17 is connected to a rear end of the exhaust device 26. The exhaust pipe 17 is laid out to extend in the rearward direction of the vehicle body along a lower surface of the floor panel 9, and connected to a silencer 18 provided under the rear region of the vehicle body.

The propeller shaft 4 will be described below. The propeller shaft 4 has a front end coupled to an output shaft 2*e* of the transmission 2*b* through a first universal joint 41, and a rear end coupled to an input shaft 3*a* of the rear differential module 3 through a second universal joint 42. The propeller shaft 4 is divided into a front shaft segment 4*a* and a rear shaft segment 4*b*, in front-rear relation, and the front and rear shaft segments 4*a*, 4*b* are coupled together through a third universal joint 43. In this embodiment, the front shaft segment 4*a* is formed to be shorter than the rear shaft segment 4*b*.

Figure 4:
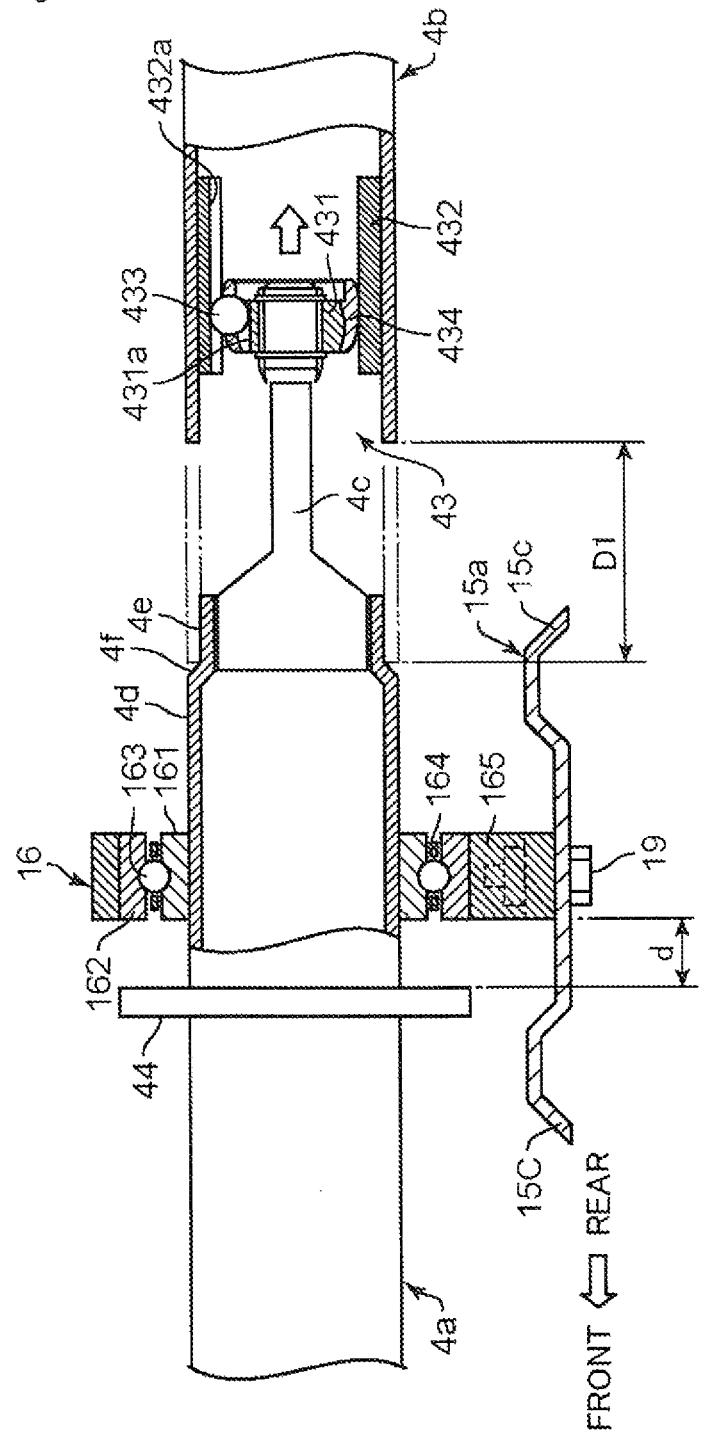
FIG. 4 is a partially sectional view enlargedly showing a third universal joint and an intermediate bearing.

FIG. 4 is a partially sectional view enlargedly showing the third universal joint 43 and the intermediate bearing 16.

The third universal joint 43 is a swing-type constant-velocity universal joint which comprises a tube-shaped outer element and a shaft-shaped inner element adapted to transmit torque while permitting an angular displacement with respect to the tube-shaped outer element, wherein it is adapted, when a given load is input in an axial direction of the propeller shaft 4, to allow the shaft-shaped inner element to be relatively displaced in the axial direction with respect to the tube-shaped outer element, whereby the front and rear shaft segments 4*a*, 4*b* each coupled to a respective one of the shaft-shaped inner element and the tube-shaped outer element are displaced in an approaching or separating direction. In other words, the propeller shaft 4 is adapted to be extendable or contractable when a load is input thereinto in the axial direction. In this embodiment, a double-offset type universal joint is employed as the third universal joint 43. Alternatively, any other swing-type constant-velocity universal joint extendable and contractable in the axial direction, such as cross-groove type or a tri-port type, may be employed.

Specifically, the third universal joint 43 is a double-offset type universal joint which comprises: an inner race 431 coupled to the front shaft segment 4*a*; an outer race 432 coupled to the rear shaft segment 4*b*; a ball 433 interposed between the inner race 431 and the outer race 432 to transmit torque between the inner and outer races 431, 432; and a cage 434 interposed between an outer peripheral surface of the inner race 431 and an inner peripheral surface of the outer race 432 to hold the ball 433, wherein it is adapted to permit an angular displacement between the front and rear shaft segments 4*a*, 4*b*. In this case, an assembly of the inner race 431, the ball 433 and the cage 434 corresponds to the shaft-shaped inner element, and the outer race 432 corresponds to the tube-shaped outer element.

The third universal joint 43 is a conventional double-offset type universal joint having a track groove 431*a* and a track groove 432*a* each formed in a respective one of the inner race 431 and the outer race 432. Thus, its detail description will be omitted. However, this embodiment has a feature in an arrangement relationship between the third universal joint 43 and each of the front and rear shaft segments 4*a*, 4*b*. Thus, this feature will be briefly described.

The inner race 431 of the third universal joint 43 is fitted on and coupled to a diametrally-reduced end (rear end) of a funnel-shaped shaft 4*c* provided at a rear end (an end opposed to the rear shaft segment 4*b*) of the front shaft segment 4*a*, in such a manner that it is rotated together with the funnel-shaped shaft 4*c*. The funnel-shaped shaft 4*c* is coupled to a diametrally-reduced portion 4*e* provided at the rear end of a shaft body 4*d* of the front shaft segment 4*a*. On the other hand, the outer race 432 is fitted in and coupled to the rear shaft segment 4*b* in a position rearwardly offset with respect to a front edge of the rear shaft segment 4*b*, in such a manner that it is rotated together with the rear shaft segment 4*b*. The outer race 432 is provided within the rear shaft segment 4*b* in the rearwardly-offset position, in the above manner. This is intended to allow the diametrally-reduced portion 4*e* of the front shaft segment 4*a* to be fitted into a space created by the rearward offset, during contraction of the propeller shaft 4.

Thus, when a load is input into the front shaft segment 4*a* in the axial direction, for example, during a frontal collision of the motor vehicle, the shaft-shaped inner element comprised of the inner race 431, the ball 433 and the cage 434 is relatively displaced with respect to the outer race 432 (tube-shaped outer element) in the axial direction (the direction indicated by the arrow in FIG. 4), so that the front shaft segment 4*a* is relatively displaced with respect to the rear shaft segment 4*b*, and fitted into the rear shaft segment 4*b*. Specifically, in an earlier stage of the fit-in displacement, the funnel-shaped shaft 4*c* of the front shaft segment 4*a* is fitted into the rear shaft segment 4*b* together with the inner race 431, the ball 433 and the cage 434. Subsequently, the diametrally-reduced portion 4*e* of the front shaft segment 4*a* is fitted into the rear shaft segment 4*b*.

The front and rear shaft segments 4*a*, 4*b* are designed such that, in a state after the front shaft segment 4*a* is fitted into the rear shaft segment 4*b* by a given amount (given distance), a diametrally-expanded step portion 4*f* of the front shaft segment 4*a* at a front end of the diametrally-reduced portion 4*e* interferes with (comes into contact with) a front edge surface of the rear shaft segment 4*b*, as indicated by the two-dot chain line in FIG. 4, to allow the fit-in displacement to be restrained. Thus, based on providing the diametrally-expanded step portion 4*f* in the front shaft segment 4*a* to serve as fit-in restraining means adapted to restrain the front shaft segment 4*a* from being fitted into the rear shaft segment 4*b* beyond the given amount, a contractable range D1 of the propeller shaft 4 is limited. Then, at an upper limit of the contractable range, the third universal joint 43 loses its function, and the angular displacement between the front and rear shaft segments 4*a*, 4*b* is disenabled, so that the front and rear shaft segments 4*a*, 4*b* function as a single rod member. A distance between the front edge of the rear shaft segment 4*b* and the rearwardly offset position of the outer race 432 is set to be greater than a length of the diametrally-reduced portion 4e of the front shaft segment 4a.

A distance between a rear edge of the diametrally-reduced portion 4e of the front shaft segment 4a and the front edge of the rear shaft segment 4b in a normal state is set to be less than a stroke of the track groove 432a of the outer race 432 of the third universal joint 43. Thus, when the front shaft segment 4a is displaced in the axial direction, a displacement path of the front shaft segment 4a is guided by the third universal joint 43 to allow the diametrally-reduced portion 4e of the front shaft segment 4a to be reliably fitted into a front end of the rear shaft segment 4b. Further, the contractable range D1 of the propeller shaft 4 is shorter than a rearward displacement-allowed range of the power unit 2 (a distance between the power unit 2 and the dash panel 10 or a length of the rearward displacement-permitting space 1a in the frontward-rearward direction of the vehicle body). Thus, an axial load caused by the rearward displacement of the power unit 2 is also transmitted directly to the rear shaft segment 4b.

The end of the front shaft segment 4a on the side of the third universal joint 43 is rotatably supported by the intermediate bearing 16. The intermediate bearing 16 is a type which comprises: a bearing inner race 161; a bearing outer race 162; a rolling element 163, such as a ball or a roller, which is interposed between the bearing inner and outer races 161, 162; a retainer 164 which retains rolling element 163 interposed between the bearing inner and outer races 161, 162; and a bracket 165 fitted on the bearing outer race 162 to hold the bearing outer race 162. The intermediate bearing 16 is attached to a first tunnel cross member 15a by fastening means 19 comprised of a bolt and a nut, through the bracket 165. The first tunnel cross member 15a is one of the two tunnel cross members 15 which is dispose on the frontward side of the vehicle body with respect to the other tunnel cross member. A combination of the first tunnel cross member 15a, the intermediate bearing 16 and the fastening means 19 is equivalent to an intermediate support section which supports one end of the front shaft segment 4a to the vehicle body (intermediate cross members 14).

Figure 5:
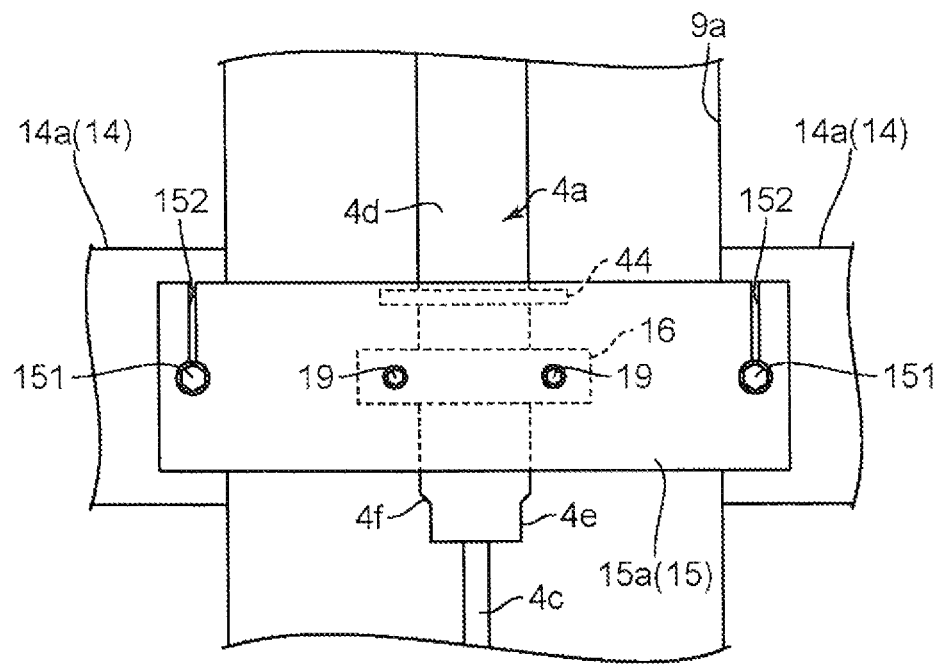
FIG. 5 is a bottom view schematically showing an attaching structure for a first tunnel cross member, in an enlarged manner.

With reference to FIGS. 4 and 5, an attaching structure for the first tunnel cross member 15a with the intermediate bearing 16 will be described. FIG. 5 is a bottom view schematically showing the attaching structure for the first tunnel cross member, in an enlarged manner. In FIG. 5, the tunnel reinforcing member 20 (see FIG. 1) provided between the intermediate cross members 14 is omitted.

As clearly shown in FIG. 4, the first tunnel cross member 15a has two curved portions 15c provided in respective ones of front and rear ends thereof to protrude upwardly, and the intermediate bearing 16 is attached to an upper surface of the first tunnel cross member 15a at a position between the curved portions 15c. As clearly shown in FIG. 5, each of opposite ends of the first tunnel cross member 15a in a longitudinal direction thereof (the widthwise direction of the vehicle body) is formed with a bolt hole (not shown) for allowing a bolt 151 to be inserted thereinto, and a slit 152 communicating with the bolt hole and extending from the bolt hole to a front edge of the first tunnel cross member 15a, in a direction opposite to a direction of a load to be input during a frontal collision (the rearward direction), i.e., in the frontward direction of the vehicle body. A width of the slit 152 is set to be narrower than a diameter of the bolt hole, and set to be narrower than a diameter of a shank of the bolt 151. The first tunnel cross member 15a is attached to a pair of right and left first intermediate cross members 14a which is one of the pairs of the intermediate cross members 14 which are disposed on, in a bridged manner, to extend across an opening at a lower end of the floor tunnel portion 9a.

Thus, upon an input of a load having a given value or more in the rearward direction of the vehicle body, the first tunnel cross member 15a is relatively displaced rearwardly with respect to the first intermediate cross members 14a, and thereby each of the bolts 151 is detached from the first tunnel cross member 15a through a respective one of the slits 152. In other words, the first tunnel cross member 15a and the intermediate bearing 16 is included in the intermediate support section set forth in the appended claims, which is adapted, upon an input of an external force having a given value or more in an axially rearward direction of the propeller shaft 4, to be released from an engaged state with (disengaged from) the first intermediate cross members 14a constituting the vehicle body.

Further, in order to apply an external force to the intermediate support section including the first tunnel cross member 15a and the intermediate bearing 16, in the axial direction, the front shaft segment 4a has a presser flange (equivalent to disengaging means) 44 provided on a frontward side of a position where the shaft body 4d of the front shaft segment 4a is supported by the intermediate bearing 16. As shown in FIG. 4, a distance d between the presser flange 44 and the intermediate bearing 16 is set to be shorter than the contractable range D1 of the propeller shaft 4 to allow the presser flange 44 to press the intermediate support section including the first tunnel cross member 15a and the intermediate bearing 16, during the course of the contraction of the propeller shaft 4.

Figure 6:
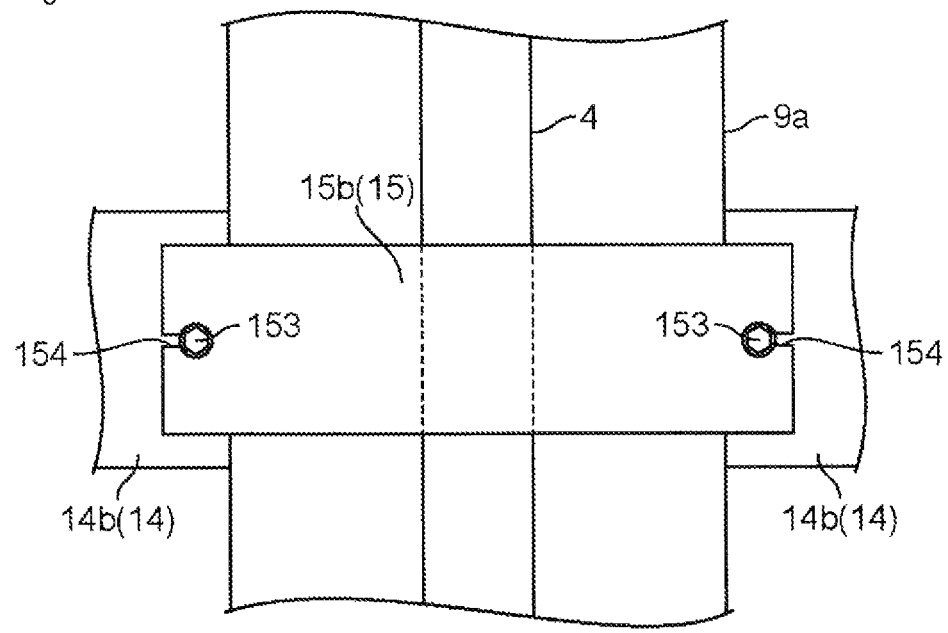
FIG. 6 is a bottom view schematically showing an attaching structure for a second tunnel cross member, in an enlarged manner.

Although a second tunnel cross member 15b which is a rear one of the two tunnel cross members 15, is designed to be disengageable, as with the first tunnel cross member 15a, it is different from the first tunnel cross member 15a in terms of a structure for disengagement. Thus, this difference will be described below. FIG. 6 is a bottom view schematically showing an attaching structure for the second tunnel cross member 15b. In FIG. 6, the tunnel reinforcing member 20 (see FIG. 1) provided between the intermediate cross members 14 is omitted.

The second tunnel cross member 15b is also formed as a rigid member which has curved portions on front and rear sides thereof in sectional view, as with the first tunnel cross member 15a. As clearly shown in FIG. 6, each of opposite ends of the second tunnel cross member 15b in a longitudinal direction thereof (the widthwise direction of the vehicle body) is formed with a bolt hole (not shown) for allowing a bolt 153 to be inserted thereinto, and a slit 154 communicating with the bolt hole and extending from the bolt hole to each of right and left edges of the second tunnel cross member 15b, outwardly in the widthwise direction of the vehicle body. A width of the slit 154 is set to be narrower than a diameter of the bolt hole, and set to be narrower than a diameter of a shank of the bolt 153. The second tunnel cross member 15b is attached to a pair of right and left second intermediate cross members 14b which is a rear one of the two pairs of the intermediate cross members 14, to extend across the opening at the lower end of the floor tunnel portion 9a.

Thus, upon an input of a downward load having a given value or more, the second tunnel cross member 15b is relatively displaced downwardly with respect to the second intermediate cross members 14b, and thereby each of the bolts 153 is detached from the second tunnel cross member 15b through a respective one of the slits 154. In other words, the second tunnel cross member 15b is adapted, under a given downward load, to be released from an engaged state with and disengaged from the second intermediate cross members 14b constituting the vehicle body.

Figure 7:
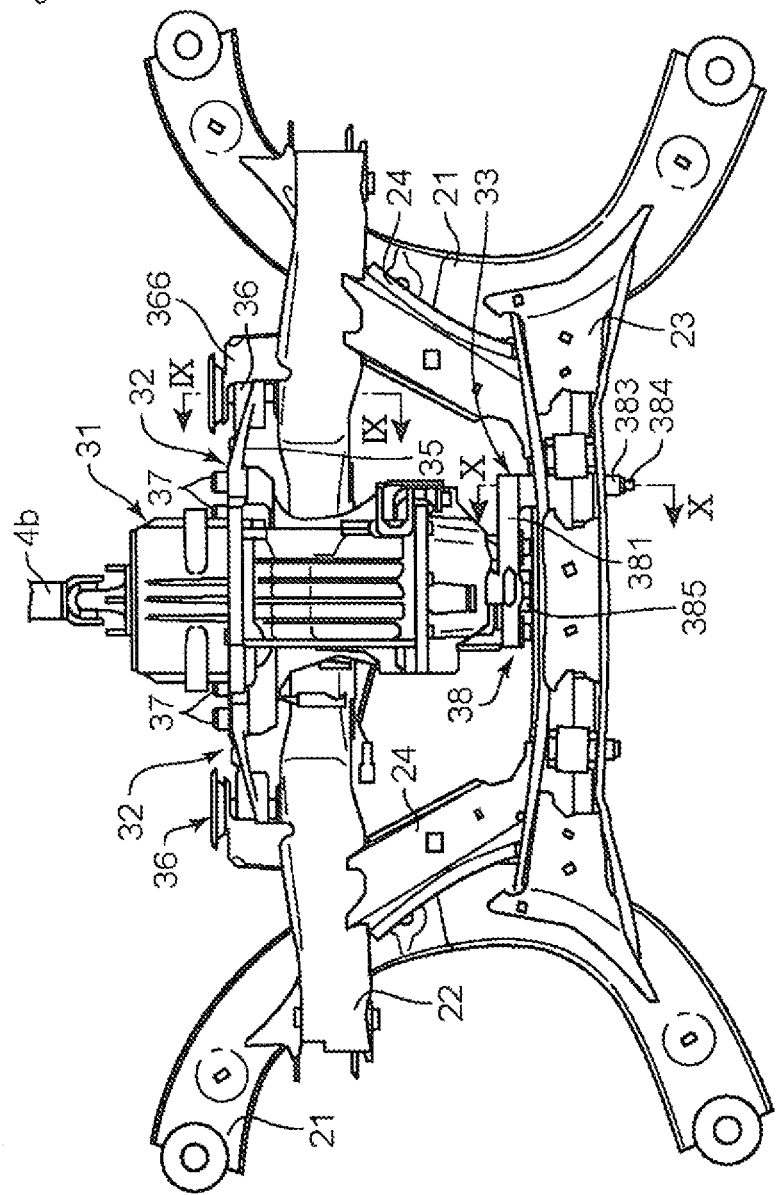
FIG. 7 is a bottom view showing a rear region of the vehicle body including a rear differential module.
Figure 8:
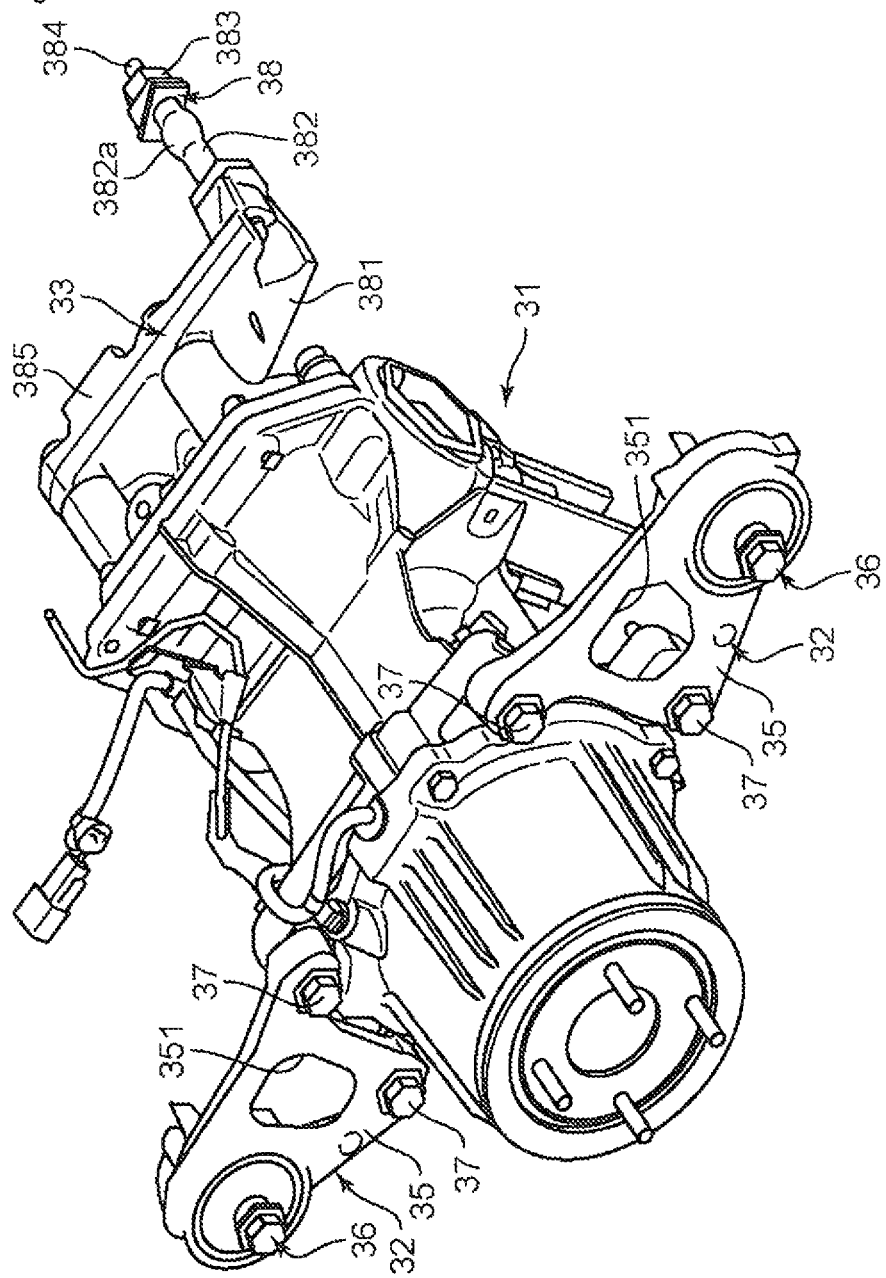
FIG. 8 is a perspective view of the rear differential module.
Figure 9:
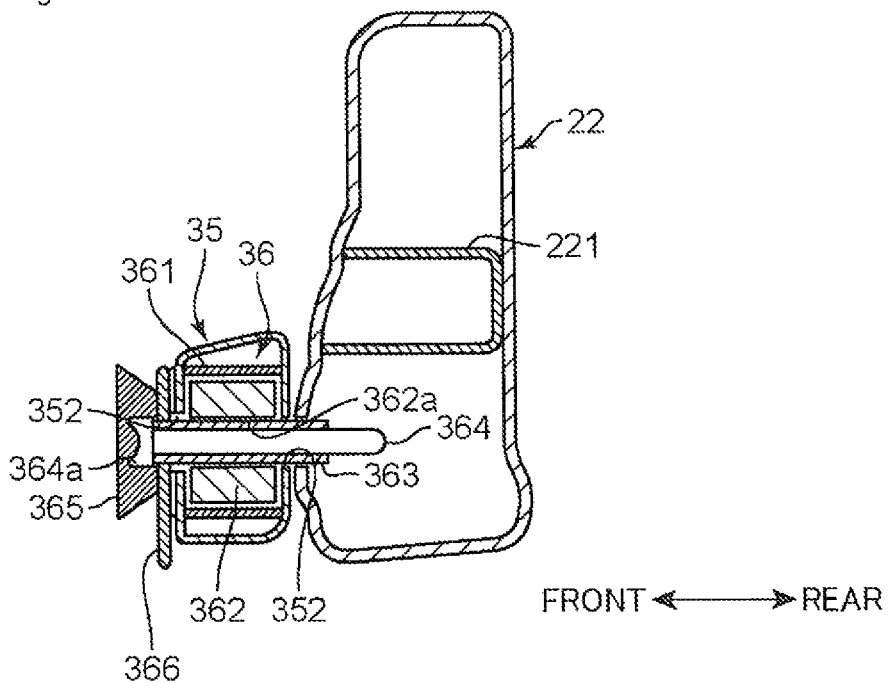
FIG. 9 is a sectional view taken along the line IX-IX in FIG. 7.
Figure 10:
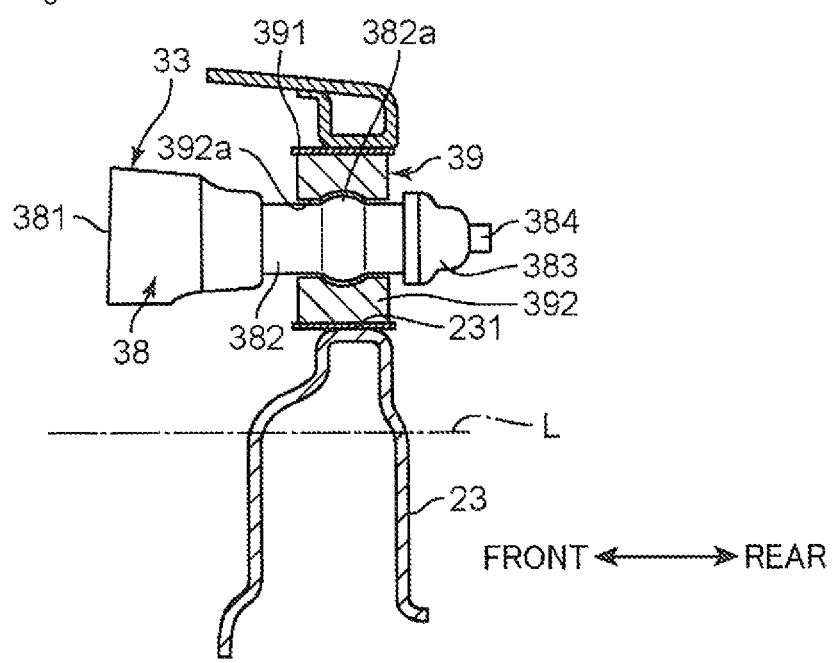
FIG. 10 is a sectional view taken along the line X-X in FIG. 7.

The rear differential module 3 attached to a rear end of the rear shaft segment 4b, and a structure for attaching the rear differential module 3 to the vehicle body, will be described below. FIG. 7 is a bottom view showing the rear region of the vehicle body including the rear differential module, and FIG. 8 is a perspective view of the rear differential module. FIGS. 9 and 10 are sectional views taken along the line IX-XI and the line X-X in FIG. 7, respectively.

The rear differential module 3 comprises a module body 31, a pair of right and left front support sections 32 which supports a front portion of the module body 31 to the vehicle body, and a rear support section 33 which supports a rear portion of the module body 31 to the vehicle body. In other words, the rear differential module 3 is supported to the rear region of the vehicle body at three points in the frontward-rearward direction of the vehicle body.

Firstly, the rear region of the vehicle body to which the rear differential module 3 is supported, will be briefly described.

Figure 14A:
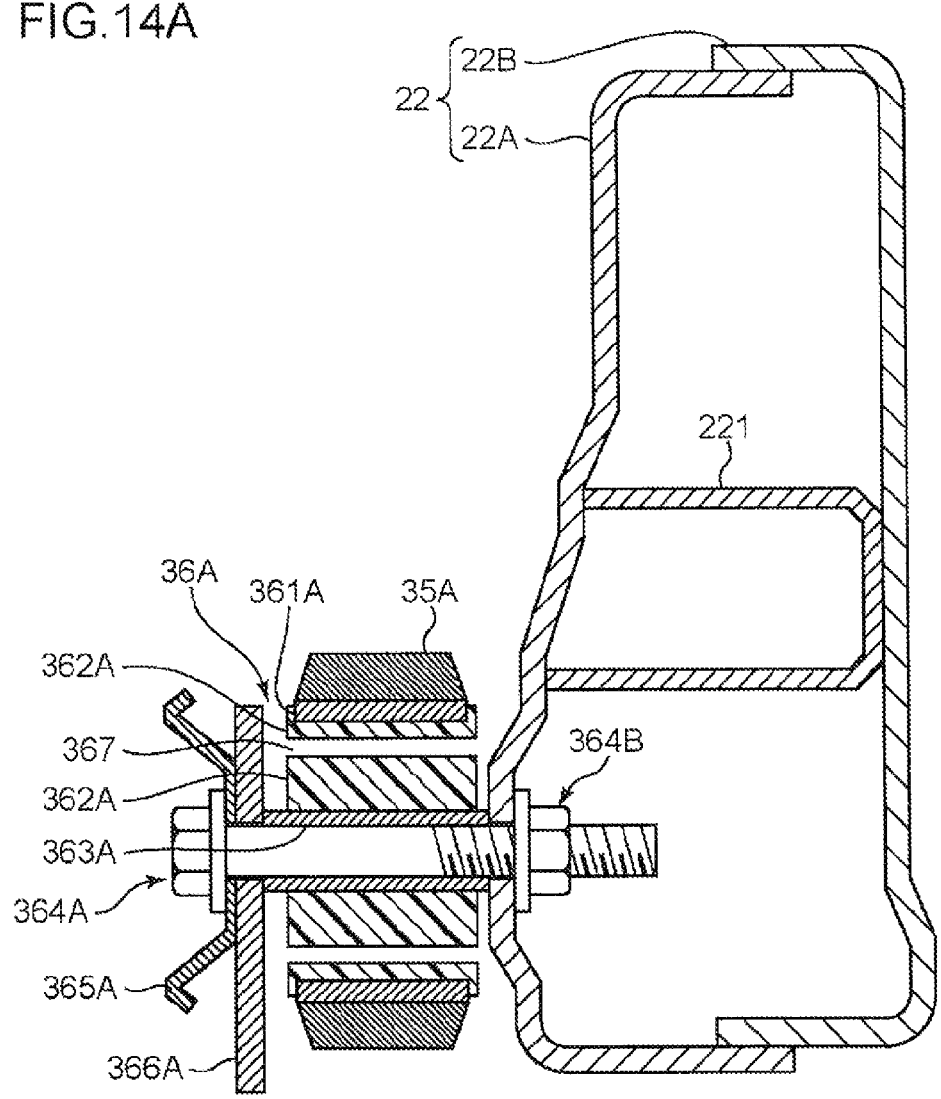
FIG. 14A illustrated an example of modification of the structure in FIG. 9.

A rear member in the rear region of the vehicle body includes: a pair of right and left rear side frames 21 each extending in the frontward-rearward direction of the vehicle body while curving inwardly in the widthwise direction of the vehicle body; a first rear suspension frame 22 bridged between the rear side frames 21 along the widthwise direction of the vehicle body; a second rear suspension frame 23 bridged between the rear side frames 21 along the widthwise direction of the vehicle body and at a position rearward of the first rear suspension frame 22; and a pair of right and left suspension frame-reinforcing members 24 each bridged between the first and second rear suspension frames 22, 23 while gradually inclining obliquely inwardly in the widthwise direction of the vehicle body, toward the rearward direction. Upper ends of a plurality of components of a multi-link rear suspension (not shown) are connected to the first and second rear suspension frames 22, 23. As shown in FIG. 14A, the first rear suspension frame 22 is actually formed as a divided structure comprised of a front panel 22A and a rear panel 22B.

A fuel tank 29 is one motor vehicle component disposed below the floor panel 9 and above the propeller shaft 4. The fuel tank 29 is disposed frontward of and obliquely above the rear differential module 3, and disposed, but not shown, on a right (lateral) side of the propeller shaft 4 in top plan view.

Specifically, the module body 31 is designed to distribute drive power from the power unit 2, to right and left drive wheels. The module body 31 is disposed beneath the first rear suspension frame 22, so that the first rear suspension frame 22 serves as a means to prevent an upward displacement of the module body 31. Further, the module body 31 is supported to the rear region of the vehicle body by connecting the front support sections 32 to the first rear suspension frame 22, and connecting the rear support section 33 disposed rearward of the front support sections 32, to the second rear suspension frame 23.

Each of the front support sections 32 comprises a front mounting bracket 35 extending outwardly in the widthwise direction of the vehicle body, from the module body 31 toward the first rear suspension frame 22, and a front differential mount 36 provided at a distal end (an end on the side of the first rear suspension frame) of the front mounting bracket 35. Based on this structure, each of the front support sections 32 supports the module body 31 at a position frontward of the rear support section 33.

As clearly shown in FIG. 8, the front mounting bracket 35 is a flat, hollow plate-shaped member having a generally triangular shape in front view, and disposed to extend in a rightward-leftward direction perpendicular to the frontward-rearward direction of the vehicle body. The front mounting bracket 35 has a base end attached to the module body 31 by a bolt 37. As shown in FIG. 9, the front differential mount 36 is housed in the distal end of a respective one of the front mounting brackets 35, and a rear wall surface of the front mounting bracket 35 is in direct contact with a front wall surface of the first rear suspension frame 22. In other words, the front mounting bracket 35 is in contact with the front wall surface of the first rear suspension frame 22 from the side of the front region of the vehicle body. The front mounting bracket 35 has an intermediate portion formed with a weight-reduction hole 351 penetrating through the intermediate portion in a thicknesswise direction thereof, so as to facilitate a reduction in weight.

The front differential mount 36 is adapted to absorb vibration in the upward-downward direction and the rightward-leftward direction by an after-mentioned mounting rubber 362, although it is incapable of absorbing vibration in the frontward-rearward direction of the vehicle body. Specifically, the front differential mount 36 comprises: an outer casing 361 having an opening oriented in the frontward-rearward direction of the vehicle body; a mounting rubber 362 housed in the outer casing 361; an inner casing 363 fitted in a center hole 362a of the mounting rubber 362 (an axis of the inner casing 363 extends in the frontward-rearward direction of the vehicle body); an attaching bolt 364 inserted into the inner casing 363 to attach the front mounting bracket 33 to the front wall surface of the first rear suspension frame 22; and a cap 365 covering a head 364a of the attaching bolt 364, wherein the inner casing 363 is loosely fitted into a mounting hole 352 provided in the front mounting bracket 35. Base on this structure, the front differential mount 36 can absorb vibration in the upward-downward direction and the rightward-leftward direction of the vehicle body by the mounting rubber 362. In FIG. 9, the reference numeral 366 indicates an attaching-bolt support section provided in the first rear suspension frame 22 to support a front end of the attaching bolt 362, and the reference numeral 221 indicates a reinforcing member provided inside the first rear suspension frame 22.

As above, the front mounting bracket 35 in this embodiment extends in a direction perpendicular to the frontward-rearward direction of the vehicle body, and the distal end thereof is in direct contact with the front wall surface of the first rear suspension frame 22. Thus, when an impact load along the frontward-rearward direction of the vehicle body is input into the rear differential module 3, for example, during a frontal collision, the impact load is directly applied to the front mounting bracket 35 as a shearing force or a bending moment, without being cushioned by the mounting rubber 362. This makes it possible to cause breaking of the front mounting bracket 35. In other words, the front mounting bracket 35 is adapted to be broken in response to an input of an impact load along the frontward-rearward direction of the vehicle body.

In addition, the front mounting bracket 35 in this embodiment is formed as a flat, hollow plate-shaped member, and the weight-reduction hole 351 is formed in the intermediate portion thereof, which provides a structure capable of more easily causing the braking when an impact load along the frontward-rearward direction of the vehicle body is input from the rear differential module 3 via the propeller shaft 4, due to a rearward displacement of the power unit 3, for example, during a frontal collision.

The rear support section 33 comprises a rear mounting bracket 38 extending from the module body 31 toward the rearward side of the vehicle body, and a rear differential mount 39 provided at a distal end (an end on the side of the second rear suspension frame) of the rear mounting bracket 38. The rear mounting bracket 38 is adapted, when an impact load is input from the front end of the vehicle body into the rear differential module 3, for example, during a frontal collision of the motor vehicle, to be relatively displaced rearwardly with respect to the rear differential mount 39, and rotatable with respect to the rear differential mount 39. Although the rear support sections 33 in this embodiment has only one support point, it may be designed to have two or more support points. In other words, the rear portion of the module body may be supported at a plurality of points.

The rear mounting bracket 38 supports the module body 31 at a position above a coupling section coupled to the rear shaft segment 4b (position corresponding to the second universal joint 42). In other words, the rear mounting bracket 38 supports the module body 31 to the second rear suspension frame 23, at a position higher than a height (indicated by the one-dot chain line L in FIG. 10) of the coupling section coupled to the rear shaft segment 4b.

Specifically, the rear mounting bracket 38 comprises: a plate-shaped connection portion 381 for connection to the module body 31; a support shaft portion 382 extending rearwardly from a position of the connection portion 381 debentured in the widthwise direction of the vehicle body (position offset in the leftward direction); and a frontward displacement-restricting anti-pull out cap 383 fixed to a distal end (rear end) of the support shaft portion 382 by a bolt 384.

The rear support section 33 has a protruding portion 385 provided integrally with the connection portion 381 to protrude rearwardly from an upper region of a rear surface thereof behind the connection portion 381 at a position corresponding to a widthwise central portion of the rear differential module 3. The protruding portion 385 is adapted, when the module body 31 is displaced rearwardly, for example, during a frontal collision of the motor vehicle, to interfere with a front surface of the second rear suspension frame 23 to give, to the module body 31, a bending moment causing the front portion of the module body 31 to be swingably moved downwardly. As shown in FIGS. 7 and 8, the protruding portion 385 is formed in a generally rectangular block-like shape in top plan view, and a protruding amount thereof is set to allow the protruding portion 385 in a state after the rear differential module 3 is mounted on the rear region of the vehicle body, to be substantially in contact with (or in slightly spaced-apart, opposed relation to) the front surface of the second rear suspension frame 23.

The support shaft portion 382 is formed in an elongate rod-like shape in which a region corresponding to the rear differential mount 39 is raised outwardly in a radial direction thereof. The raised region 382a is adapted to be bitten into an after-mentioned mounting rubber 392 of the rear differential mount 39 so as to absorb vibration in the frontward-rearward direction of the vehicle body in the normal state, to a certain extent by the after-mentioned mounting rubber 392.

The anti-pull out cap 383 is designed to prevent the rear mounting bracket 38 from being pulled out frontwardly, and formed in a circular truncated cone shape.

The rear differential mount 39 is adapted to absorb vibration in the frontward-rearward direction of the vehicle body to a certain extent, as well as vibration in the upward-downward direction and the rightward-leftward direction, by the after-mentioned mounting rubber 392. Specifically, the rear differential mount 39 comprises a rear outer casing 391 having an opening oriented in the frontward-rearward direction of the vehicle body, and a mounting rubber 392 housed in the rear outer casing 391, wherein the support shaft portion 382 of the rear mounting bracket 38 is fitted into a center hole 392a of the mounting rubber 392. The rear outer casing 391 is fittingly attached to a support hole 231 formed to penetrate through the second rear suspension frame 23 along the frontward-rearward direction of the vehicle body.

As above, in the rear support section 33 in this embodiment, when an impact load is input in the rearward direction of the vehicle body, for example, during a frontal collision of the motor vehicle, the rear mounting bracket 38 is relatively displaced rearwardly with respect to the rear differential mount 39, and thereby an engaged state between the raised region 382a and the mounting rubber 392 is released. During the above process, the rear mounting bracket 38 supports the module body 31 at a position above the coupling section coupled to the rear shaft segment 4b, so that it becomes possible to reliably apply, to the module body 31, a bending moment causing the module body 31 to be swingably moved downwardly, in response to an input of the impact load.

Figure 11:
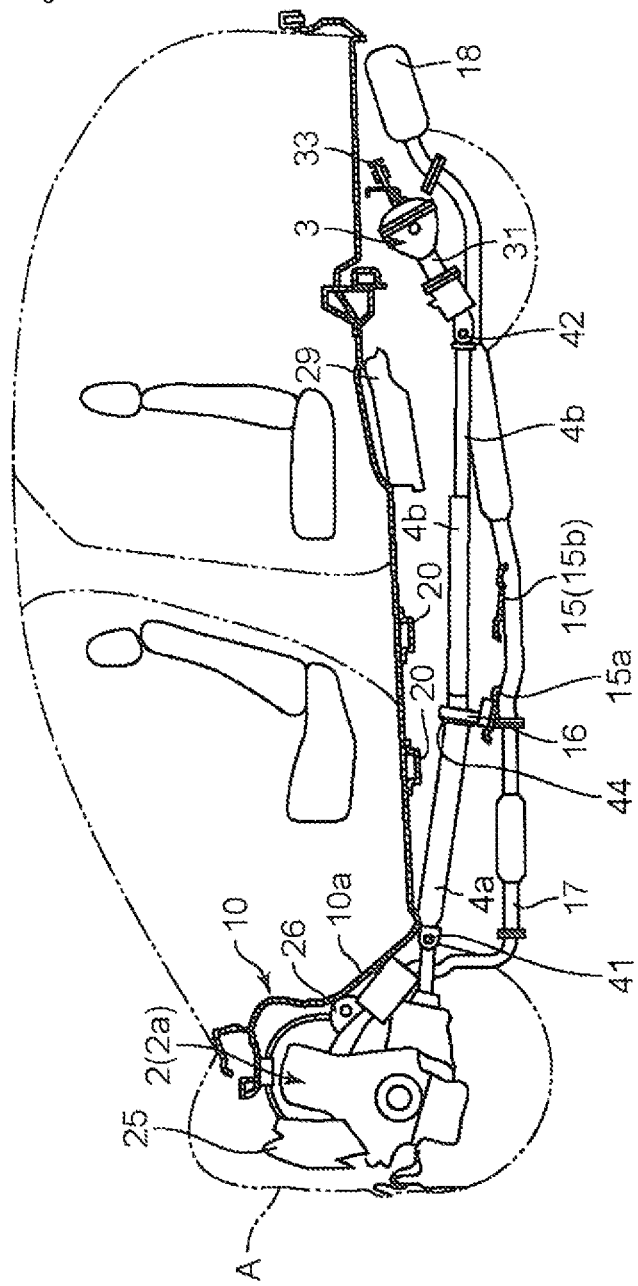
FIG. 11 is a side view schematically showing the motor vehicle during a frontal collision thereof.
Figure 12:
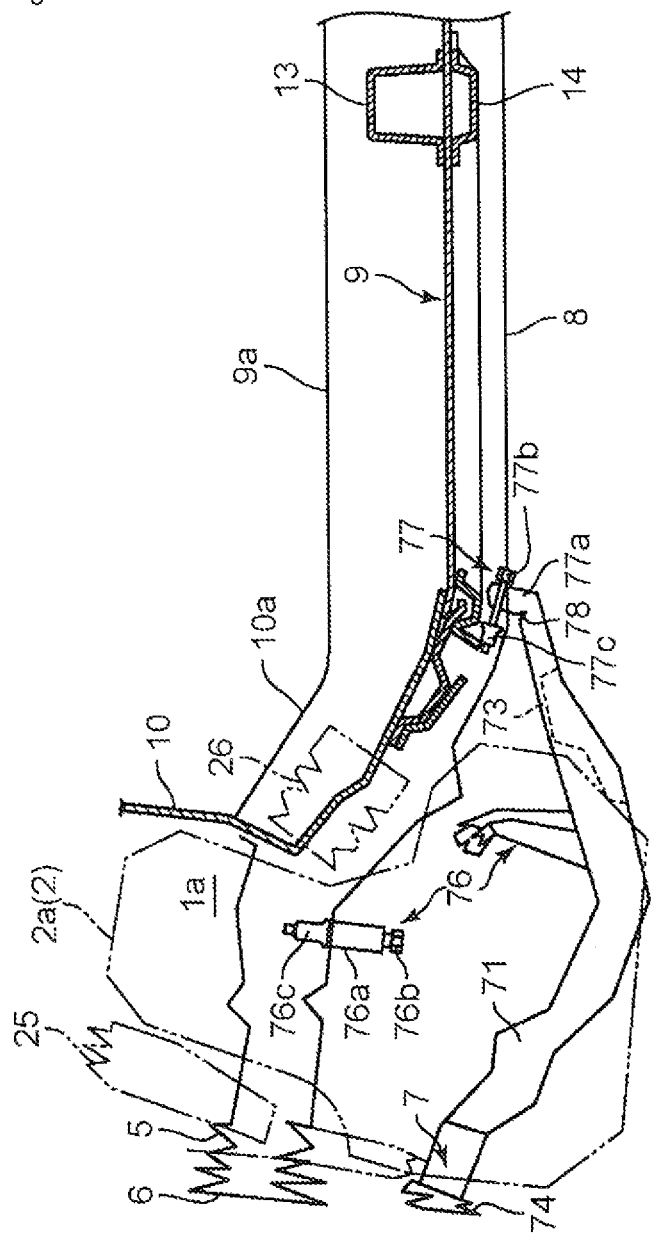
FIG. 12 is a side sectional view showing the structure of the front region of the vehicle body during the frontal collision of the motor vehicle.
Figure 13:
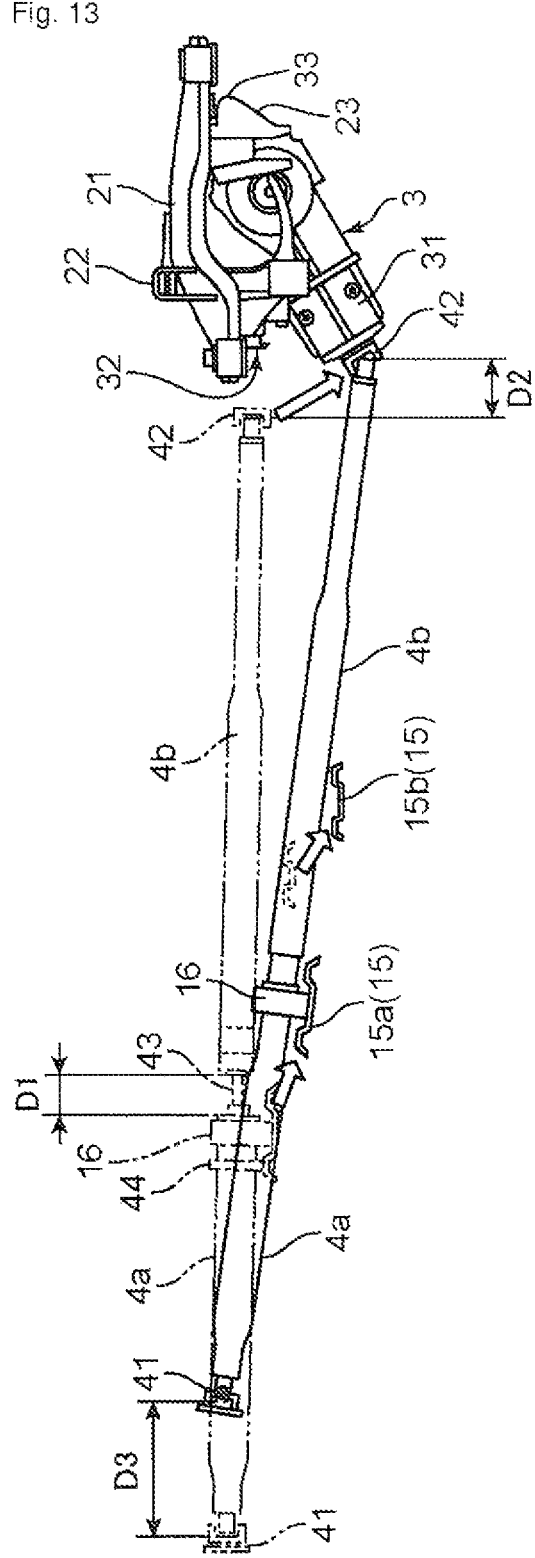
FIG. 13 is a side view schematically showing a part of the powertrain system during the frontal collision of the motor vehicle.

With reference to FIGS. 11 to 13, an operation of the above powertrain system 1 and the motor vehicle lower structure with the powertrain system during a frontal collision of the motor vehicle will be described. FIG. 11 is a side view schematically showing the motor vehicle during a frontal collision thereof, and FIG. 12 is a side sectional view showing the front structure of the vehicle body during the frontal collision of the motor vehicle. FIG. 13 is a side view schematically showing the propeller shaft and the rear differential module during the frontal collision. In FIG. 13, the two-dot chain line indicates the propeller shaft and others before the collision, and the solid line indicates the propeller shaft and others after the collision.

In the event of a frontal collision of a motor vehicle, it is necessary to ensure a collapsible amount in a front region of a vehicle body to reduce an impact force against an occupant. For this purpose, as show in FIG. 11, a front end panel A is pushed in the rearward direction of the vehicle body, and then the respective crash cans 61, 74 of the front side frames 5 and the front subframe 7 (see FIGS. 1 and 2) are sequentially crushed or collapsed in the rearward direction of the vehicle body to absorb impact. When the pushed front end panel A reaches the power unit 2, an impact load is received by an approximately planar surface of the power unit 2 and the intake manifold 25. Thus, the power unit 2 starts being displaced horizontally rearwardly (some level of error may be included). The rearward displacement-permitting space 1a is defined between the power unit 2 and the dash panel 10 located horizontally rearward of the power unit 2. Thus, during the above process, the power unit 2 can be reliably displaced just rearwardly (horizontally rearwardly).

In connection with start of the rearward displacement of the power unit 2, the intermediate frame-support units 76 of the front subframe 7 are firstly broken, and subsequently the rear frame support units 77 of the front subframe 7 are broken (see FIG. 12). During this process, the front subframe 7 is bent downwardly along the beads 78, and the power unit 2 is further inclined rearwardly.

The power unit 2 is supported from therebehind by the propeller shaft 4, and the propeller shaft 4 is coupled to the rear differential module 3, so that the propeller shaft 4 will function as a bracing bar. In the powertrain system according to this embodiment, the propeller shaft 4 is formed in a contractable structure, and the rear differential module 3 is supported to the vehicle body in such a manner as to allow the front portion of the module body 31 to be swingably moved downwardly, so that it becomes possible to sufficiently ensure a rearward displacement amount of the power unit 2.

Specifically, upon start of the rearward displacement of the power unit 2, an impact load is firstly input into the propeller shaft 4, particularly, the front shaft segment 4a, in the axial direction thereof, and thereby the front shaft segment 4a is displaced rearwardly while breaking the intermediate bearing 16. During this process, the power unit 2 can be displaced horizontally rearwardly toward the rearward displacement-permitting space 1a, so that it becomes possible to reliably transmit the load along the axial direction of the propeller shaft 4, particularly, the front shaft segment 4a.

Along with the rearward displacement of the front shaft segment 4a, the shaft-shaped inner element comprised of the inner race 431, the ball 433 and the cage 434, in the third universal joint 43, is relatively displaced in the axial direction with respect to the outer race 432, and thereby the front shaft segment 4a is relatively displaced with respect to the rear shaft segment 4b and inserted into the rear shaft segment 4b. A specific operation has already been described, and its description will be omitted here.

Further, along with the rearward displacement of the front shaft segment 4a, the presser flange 44 of the front shaft segment 4a is displaced rearwardly to interfere with the intermediate bearing 16, and thereby the rearward load is input into the intermediate support section including the intermediate bearing 16 and the first tunnel cross member 15a. When this load is increased to a given value or more, the first tunnel cross member 15a is relatively displaced rearwardly with respect to the first intermediate cross members 14a, and thereby the first tunnel cross member 15a is released from the engaged state with (disengaged from) the first intermediate cross members 14a. As above, the intermediate support section including the intermediate bearing 16 and the first tunnel cross member 15a is adapted to be disengaged from the vehicle body (first intermediate cross members 14a), so that it makes it possible to reliably avoid a situation where, when the rear differential module 3 is shifted toward the front-tilting posture as described later, the propeller shaft 4 is caught by the first intermediate cross members 15a and thereby hindered from the front-tilting, so as to allow the power unit 2 to be smoothly displaced rearwardly during a frontal collision.

Then, the propeller shaft 4 starts being contracted. Thus, the diametrally-reduced portion 4e of the front shaft segment 4a is fitted into the distal end of the rear shaft segment 4b, and the diametrally-expanded step portion 4f interferes with the front edge surface of the rear shaft segment 4b to restrain farther fit-in. The propeller shaft 4 after the contraction functions as a single piece of shaft. The contractive range of the propeller shaft 4 is shorter than the rearward displacement-allowed range of the power unit 2 determined by the rearward displacement-permitting space 1a, so that even after completion of the contraction of the propeller shaft 4, a load can further be input into the rear differential module 3 according to a rearward displacement of the power unit 2. Specifically, even in a fully contracted state of the propeller shaft 4, a load is further input rearwardly, and finally input into the rear differential module 3 via the propeller shaft 4.

Upon the input of the impact load into the rear differential module 3, the front differential mount brackets 35 of the right and left front support sections 32 are broken, and thereby the raised region 382a of the support shaft portion 382 of the rear support section 33 is pushed out rearwardly from the rear differential mount 39. In this state, the load is continuously input from the propeller shaft 4, and the protruding portion 385 interferes with the second rear suspension frame 23, so that a bending moment causing a downward swinging movement of the front portion of the module body 31 is produced in the module body 31. Therefore, the front portion of the module body 31 is swingably moved downwardly, and a posture of the module body 31 is changed toward the front-tilting posture. Further, along with the downward swinging movement, the coupling section (position corresponding to the second universal joint 42) coupled to the propeller shaft 4 will also be displaced rearwardly in the frontward-rearward direction of the vehicle body. Thus, a support position of the rear end of the propeller shaft 4 is displaced rearwardly, and the rearward displacement amount of the power unit 2 is increased by just that much.

In addition, along with the rearward displacement of the power unit 2, the exhaust device 26 disposed therebehind is pushed by the power unit 2, and thereby displaced rearwardly while being collapsed and compacted. Along with this rearward movement, the exhaust device 26 is pushed into the dash tunnel portion 10a, because it is originally provided to face the dash tunnel portion 10a in the frontward-rearward direction of the vehicle body. Thus, the rearward displacement-permitting space 1a can be ensured along with the rearward displacement of the power unit 2, although the exhaust device 26 is initially disposed in the rearward displacement-permitting space 1a. As above, the powertrain system according to this embodiment allows the power unit 2 to be reliably displaced rearwardly, while maintain layout flexibility for the exhaust device 26.

Meanwhile, the swinging movement of the rear differential module 3 is likely to cause interference between the propeller shaft 4 and the second tunnel cross member 15b. However, in a motor vehicle lower structure in this embodiment, the second tunnel cross member 15b is formed with the slits 154, so that it is joined to the vehicle body in such a manner as to be disengageable therefrom under a downward load. Thus, even if the path of the propeller shaft 4 is shifted downwardly due to the front-tilting of the rear differential module 3, the engaged state between the second tunnel cross member 15b and each of the second intermediate cross members 14b is released by a load occurring when the propeller shaft 4 interferes with the second tunnel cross member 15b. This makes it possible to allow the power unit 2 to be reliably displaced rearwardly during a frontal collision, while providing the second tunnel cross member 15b to enhance the rigidity of the vehicle body.

As described above, in the powertrain system 1 according to the above embodiment, in addition to ensuring the rearward displacement amount D1 of the power unit 2 by the mechanism for allowing the propeller shaft 4 to be contracted, an additional rearward displacement amount D2 can be ensured by a simple mechanism based on an improvement in support structure for the module body 31 of the rear differential module 3. Thus, a rearward displacement amount of the power unit: D3>(D1+D2), can be sufficiently ensured, while maximally suppressing an increase in production cost.

When the rearward displacement amount of the power unit 2 reaches D3 in FIG. 13, the power unit 2 is supported from a rear side thereof by the propeller shaft 4 and thereby blocked from being farther displaced rearwardly. Thus, it becomes possible to effectively prevent the power unit 2 from being excessively displaced rearwardly to enter the passenger compartment. In other words, the rearward displacement amount D3 of the power unit 2 is set to be shorter than the distance between the power unit 2 and the dash panel 10.

Each of the aforementioned powertrain system 1 and the aforementioned motor vehicle lower structure with powertrain system 1 is one embodiment of the present invention, and various changes and modifications may be appropriately made in the specific embodiment without departing from the sprit and scope of the present invention. Some examples of the change/modification will be described below.

Figure 14B:
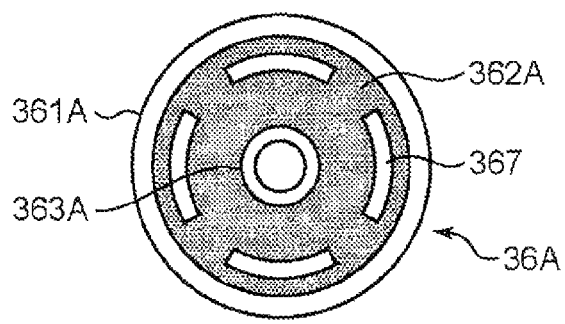
FIG. 14B is a front sectional view of a mounting bush in FIG. 14A.

(1) In the above embodiment, in order to allow the front mounting bracket 35 to be easily broken, the front mounting bracket 35 is formed (arranged) 1) to extend in a direction perpendicular to the frontward-rearward direction, 2) to be in direct contact with the front wall surface of the first rear suspension frame 22, 3) as a flat, hollow plate-shaped member, and 4) with the weight-reduction hole 351 in the intermediate portion thereof. However, a specific structure/arrangement for the easy-breakability is not limited thereto. For example, a brittle portion, such as a thin-walled portion or a bent portion, may be provided in the front mounting bracket. These elements may be used in combination or independently. FIG. 14A is a front sectional view showing an example of modification of the structure in FIG. 9. As shown in FIG. 14, the front mounting bracket 35 may be formed of a cast member (such as cast aluminum alloy) having relatively high hardness, and toughness less than that of the first rear suspension frame 22. In this case, it becomes possible to satisfy both rigidity in a normal state and easy-breakability during a collision. More specifically, in the above embodiment, in order to allow the front mounting bracket 35 to be easily broken, the front mounting bracket 35 is disposed to be in direct contact with the front wall surface of the first rear suspension frame 22. In the modification illustrated in FIG. 14A, a front mounting bracket 35A is disposed to face a rear member of the vehicle body from the side of the front region of the vehicle body through a given rubber mounting bush 36A which comprises: an inner casing 363A; an outer casing 361A; and a mounting rubber 362A formed as an elastic body and provided between the inner and outer casings in a non-slidable manner. As shown FIG. 14B, the mounting rubber 362A is formed with four slits 367 (void spaces) on upper, lower, right and left sides in front view, and adapted to be elastically deformed in upward-downward and rightward-leftward directions in a relatively easy manner within a range of the slits 367. The outer casing 361A is formed to be shorter than the inner casing 363A in the frontward-rearward direction, and supported by the mounting rubber 362A at an intermediate position of the inner casing 363A in the frontward rearward direction of the vehicle body, during a no-load condition. Then, under a condition that the inner casing 363A is clamped between the front surface of the first rear suspension frame 22 serving as a rear member of the vehicle body, and an attaching-bolt support section 366A, the inner casing 363A is fastened to the first rear suspension frame 22 and the attaching-bolt support section 366A, by a bolt 364A, and a nut 364B fixed inside the first rear suspension frame 22. A cap 365A is clamped between a bolt head of the bolt 364A and the attaching-bolt support section 366A. Thus, in the rubber mounting bush 36A, the mounting rubber 364A is adapted, in the normal state, to be elastically deformed to permit the outer casing 361A and a front mounting bracket 35A joined to the outer casing 361A to be displaced in the frontward-rearward direction of the vehicle body with respect to the rear region of the vehicle body, to an extent that the outer casing 361A is free of collision with the rear member of the vehicle body, and attenuate vibration of the differential module 3 in the frontward-rearward direction. On the other hand, in cases where the power plant 2 approaches the differential module 3 in the frontward-rearward direction during a collision of the motor vehicle, the front mounting bracket 35A is displaced rearwardly against elastic resistance of the mounting rubber 362A, and brought into direct collision with the rear member 22 of the vehicle body to cause an instantaneously high impact load.

The slit 367 of the mounting rubber 362A is appropriately provided, for example, in order to suppress vibration of the passenger compartment during a normal traveling condition. The slit 367 is not an essential element of the present invention, but may be omitted. In this case, the elastic resistance of the mounting rubber 362A in the frontward-rearward direction of the vehicle body becomes lower. However, this is desirable in view of increase an instantaneously peak of impact load occurring when the front mounting bracket 35A directly collides with the rear member 22 of the vehicle body.

(2) Although the above embodiment has been described based on one example where the power unit 2 comprises the gasoline engine 2a, the power unit is not limited thereto. For example, it may comprise a hydrogen engine, or may comprise an electric motor in case of an electric vehicle or a fuel-cell vehicle.

(3) In the above embodiment, a rear end of the front subframe 7 is connected to the tunnel frame 11. Alternatively, in a motor vehicle devoid of the tunnel frame 11, the rear end of the front subframe 7 may be connected to other vehicle body member, such as the floor frames 8.

INDUSTRIAL APPLICABILITY

It is possible to provide a powertrain system for a motor vehicle, capable of sufficiently ensuring a rearward displacement amount of a power unit during a collision in a frontward-rearward direction of a vehicle body, to sufficiently obtain an effect of reducing transmission of collision-impact against an occupant, and a motor vehicle lower structure having the powertrain system.

The invention claimed is:
1. A powertrain system for a motor vehicle, comprising a power unit provided in a front region of a vehicle body, a differential module provided in a rear region of the vehicle body, a power transmitting shaft provided to extend in a frontward-rearward direction of the vehicle body to transmit drive power of the power unit to the differential module, and an intermediate support section which rotatably supports the power transmitting shaft wherein:
   the power transmitting shaft comprises a front shaft segment and a rear shaft segment which are divided in front-rear relation through the intermediary of a universal joint, the power transmitting shaft, during a relative displacement between the power unit and the differential module in an approaching direction, along with deformation of the vehicle body, being contracted in such a manner that one of the front and rear shaft segments is fitted into an end of the other shaft segment over a given range, together with at least a part of the universal joint;
   the differential module has a module body, a coupling section for coupling between the module body and the power transmitting shaft, and a rear support section for support to the vehicle body, the rear support section being disposed in a rear portion of the module body and above the coupling section, and, during the relative displacement in the approaching direction, supporting the module body to the vehicle body in such a manner as to allow a front portion of the module body to be swingably moved downwardly;
   the intermediate support section rotatably supports an end of the front shaft segment on the side of the universal joint, to the vehicle body, and, when an axial external force having a given value or more is input from the front shaft segment thereinto, is released from an engaged state with the vehicle body;
   the front shaft segment has a disengaging part that is displaced in the axial direction within a contractable range of the power transmitting shaft and that is brought into contact with and presses the intermediate support section to release the engaged state between the intermediate support section and the vehicle body, during a collision in a frontward-rearward direction of the vehicle body;

the rear support section has a rear differential mount attached to a rear suspension frame in the rear region of the vehicle body and defining a hole oriented in the frontward-rearward direction of the vehicle body, and a rear mounting bracket having a support shaft portion fitted into the hole of the rear differential mount; and the rear mounting bracket is provided with a protruding portion protruding rearwardly, a protruding amount of the protruding portion being set to allow the protruding portion in a state after the rear differential module is mounted on the rear region of the vehicle body, to be substantially in contact with the front surface of the rear suspension frame.

2. The powertrain system as defined in claim 1, wherein the differential module further has a front support section which supports the module body to a rear member of the vehicle body, on a frontward side of the vehicle body with respect to the rear support section, the front support section including a support bracket which extends from the module body toward the rear member of the vehicle body, wherein one end of the support bracket is disposed to face the rear member of the vehicle body in the frontward-rearward direction of the vehicle body from the front side of the vehicle body, and, during the relative displacement between the power unit and the differential module in the approaching direction, is brought into contact with the rear member of the vehicle body from the side of the front region of the vehicle body, and, during a relative movement between the power unit and the module body in an approaching direction, to be broken.

3. The powertrain system as defined in claim 1, wherein the power transmitting shaft is provided with a fit-in restraining part that restrains the one of the front and rear shaft segments from being fitted into the end of the other shaft segment beyond a given amount, so as to limit a contractable range thereof.

4. A motor vehicle lower structure comprising: the powertrain system as defined in claim 1; a floor tunnel portion which extends along the frontward-rearward direction of the vehicle body and receives therein the power transmitting shaft of the powertrain system along the frontward-rearward direction of the vehicle body; and a tunnel cross member provided in the vehicle body in such a manner as to extend across the floor tunnel portion in a widthwise direction of the vehicle body, at a position beneath the power transmitting shaft, wherein the tunnel cross member is joined to the vehicle body in such a manner that it is disengageable from the vehicle body under a downward load.

5. The powertrain system as defined in claim 1, wherein the vehicle body has a rearward displacement-permitting space defined between the power unit and a dash panel disposed horizontally rearward of the power unit, wherein the power unit, during the relative displacement in the approaching direction, is displaceable horizontally rearwardly over a given rearward displacement-allowed range thereof.

6. The powertrain system as defined in claim 5, wherein the power transmitting shaft is provided with a fit-in restraining part that expands in a radial direction thereof to restrain the one of the front and rear shaft segments from being fitted into the end of the other rear shaft segment beyond a given amount, so as to limit a contractable range thereof, and wherein the contractable range of the power transmitting shaft is shorter than the rearward displacement-allowed range of the power unit.

7. A motor vehicle lower structure comprising: the powertrain system as defined in claim 6, the powertrain system including an engine body as a part of the power unit; a dash panel disposed rearward of the power unit of the powertrain system; and an exhaust device connected to the power unit and disposed in the rearward displacement-permitting space, wherein the dash panel has a dash tunnel portion concaved in a rearward direction of the vehicle body, and the exhaust device is disposed to face the dash tunnel portion in front-rear relation.

8. A motor vehicle lower structure comprising the powertrain system as defined in claim 6, the powertrain system including an engine body as a part of the power unit; and an intake manifold for introducing fresh air into the engine body, wherein the engine body is a transverse type which is mounted to allow a crankshaft thereof to be oriented in a direction transverse to a travelling direction of the motor vehicle, and wherein the engine body is disposed such that an upper portion thereof is inclined rearwardly, and the intake manifold is disposed in front of the upper portion of the engine body.

9. A powertrain system for a motor vehicle, comprising a power unit provided in a front region of a vehicle body, a differential module provided in a rear region of the vehicle body, a power transmitting shaft provided to extend in a frontward-rearward direction of the vehicle body to transmit drive power of the power unit to the differential module, wherein:

the power transmitting shaft comprises a front shaft segment and a rear shaft segment which are divided in front-rear relation through the intermediary of a universal joint, the power transmitting shaft, during a relative displacement between the power unit and the differential module in an approaching direction, along with deformation of the vehicle body, being contracted in such a manner that one of the front and rear shaft segments is fitted into an end of the other shaft segment over a given range, together with at least a part of the universal joint;

the differential module has a module body, a coupling section for coupling between the module body and the power transmitting shaft, and a rear support section for support to the vehicle body, the rear support section being disposed in a rear portion of the module body and above the coupling section, and, during the relative displacement in the approaching direction, supporting the module body to the vehicle body in such a manner as to allow a front portion of the module body to be swingably moved downwardly;

the rear support section has a rear differential mount attached to a rear suspension frame in the rear region of the vehicle body and defining a hole oriented in the frontward-rearward direction of the vehicle body, and a rear mounting bracket having a support shaft portion fitted into the hole of the rear differential mount; and the rear mounting bracket is provided with a protruding portion protruding rearwardly, a protruding amount of the protruding portion being set to allow the protruding portion in a state after the rear differential module is mounted on the rear region of the vehicle body, to be substantially in contact with the front surface of the rear suspension frame.

* * * * *